US012524578B2

(12) United States Patent
Wu et al.

(10) Patent No.: US 12,524,578 B2
(45) Date of Patent: Jan. 13, 2026

(54) PROCESSOR ARCHITECTURE AND RELATED TECHNIQUES

(71) Applicant: Jonetix Corporation, Cupertino, CA (US)

(72) Inventors: Paul Ying-Fung Wu, Saratoga, CA (US); Harry Leslie Tredennick, Los Gatos, CA (US)

(73) Assignee: Jonetix Corporation, Cupertino, CA (US)

( * ) Notice: Subject to any disclaimer, the term of this patent is extended or adjusted under 35 U.S.C. 154(b) by 198 days.

(21) Appl. No.: 18/072,444

(22) Filed: Nov. 30, 2022

(65) Prior Publication Data

US 2023/0195943 A1 Jun. 22, 2023

Related U.S. Application Data

(60) Provisional application No. 63/292,604, filed on Dec. 22, 2021.

(51) Int. Cl.
*G06F 21/72* (2013.01)
*G06F 12/14* (2006.01)
(Continued)

(52) U.S. Cl.
CPC .......... *G06F 21/72* (2013.01); *G06F 12/1408* (2013.01); *G06F 21/602* (2013.01); *G06F 21/755* (2017.08); *H04L 2209/08* (2013.01)

(58) Field of Classification Search
CPC ......... G06F 21/755; G06F 21/72; G06F 15/02
See application file for complete search history.

(56) References Cited

U.S. PATENT DOCUMENTS 4,121,760 A * 10/1978 Cochran ................. G06F 15/02
341/78
2002/0178371 A1* 11/2002 Kaminaga ............... G06F 7/723
713/189

(Continued)

OTHER PUBLICATIONS

Guerrini et al. ("Randomized Mixed-Radix Scalar Multiplication," in IEEE Transactions on Computers, vol. 67, No. 3, pp. 418-431, Mar. 1, 2018, doi: 10.1109/TC.2017.2750677; hereinafter Guerrini) (Year: 2018).*

(Continued)

*Primary Examiner* — William R Korzuch
*Assistant Examiner* — Aditya Sriram
(74) *Attorney, Agent, or Firm* — Marc P. Schuyler

(57) ABSTRACT

This disclosure provides techniques for permuting the performance of associative functions by circuitry of a digital device or processor in a manner that disrupts the effectiveness of side channel attacks. In specific embodiments, associative functions performed by math processing circuitry in such a device are permuted so as to mask/obfuscate a power signature and/or other externally-observable effects while providing an invariant result as an output. In still more detailed embodiments, a variable radix processor is used to provide conversion of an input operand to a permutation of associative functions. The radix can be varied across different products and/or can be dynamically varied during operation of a device, e.g., based on seeds from a random number generator. In still more detailed embodiments, conventional "double-and-add" or "square-and-multiply" execution units can be variably scripted to mask power signature and/or other patterns.

20 Claims, 8 Drawing Sheets

(51) Int. Cl.
   *G06F 21/60*   (2013.01)
   *G06F 21/75*   (2013.01)

(56) References Cited

U.S. PATENT DOCUMENTS

| | | | | |
|---|---|---|---|---|
| 2008/0019509 A1* | 1/2008 | Al-Gahtani | ............ | H04L 9/3066 380/30 |
| 2008/0130873 A1* | 6/2008 | Bolotov | ................ | H04L 9/3066 380/28 |
| 2009/0044080 A1* | 2/2009 | Michaels | ................ | G06F 7/725 714/780 |
| 2009/0067617 A1* | 3/2009 | Trichina | ................ | G06F 7/723 380/28 |
| 2012/0163584 A1* | 6/2012 | Adjedj | .................... | H04L 9/003 380/28 |
| 2014/0281573 A1* | 9/2014 | Jaffe | ....................... | H04L 9/003 713/189 |
| 2017/0005811 A1* | 1/2017 | Tremlet | ................ | H04L 9/3278 |
| 2017/0180114 A1* | 6/2017 | Murdica | ................. | H04L 9/003 |
| 2020/0044817 A1* | 2/2020 | Soukharev | .............. | H04L 63/00 |
| 2021/0409188 A1* | 12/2021 | Ghosh | .................... | G06F 7/725 |

OTHER PUBLICATIONS

Coron ((1999). Resistance Against Differential Power Analysis For Elliptic Curve Cryptosystems. In: Koç, .K., Paar, C. (eds) Cryptographic Hardware and Embedded Systems. CHES 1999. Lecture Notes in Computer Science, vol. 1717. Springer, Berlin, Heidelberg. https://doi.org/10.1007/3-540-48059-5_25) (Year: 1999).*

Detrey, J., Imbert, L. (2019). Breaking Randomized Mixed-Radix Scalar Multiplication Algorithms. In: Schwabe, P., ThÃ@riault, N. ( eds) Progress in Cryptology â LATINCRYPT 2019. LATINCRYPT 2019. Lecture Notes in Computer Science(), vol. 11774. Springer, Cham. https://doi.org/10.1007/978-3-0 (Year: 2019).*

Detrey, J., Imbert, L. (2019). Breaking Randomized Mixed-Radix Scalar Multiplication Algorithms. In: Schwabe, P., Theriault, N. (eds) Progress in Cryptology—LATINCRYPT 2019. LATINCRYPT 2019. Lecture Notes in Computer Science(), vol. 11774. Springer, Cham. https://doi.org/10.1007/978-3-0 (Year: 2019).*

* cited by examiner

PROCESSOR ARCHITECTURE AND RELATED TECHNIQUES

REFERENCE TO RELATED APPLICATIONS

This patent application claims the benefit of U.S. Provisional Patent Application No. 63/292,604, filed on Dec. 22, 2021, on behalf of first-named inventor Paul Ying-Fung Wu, for "Variable Radix Processor Architecture And Related Techniques;" the aforementioned patent application is hereby incorporated by reference. This patent application also hereby incorporates by reference U.S. patent Ser. No. 10/891,366, having a first-named inventor of Paul Ying-Fung Wu, and issued for "Secure Hardware Signature And Related Methods And Applications;" this incorporated-by-reference patent describes several examples of physically unclonable functions, secure processors, random number generators and cryptographic techniques that can optionally be used with techniques described herein to generate random numbers or other values, and otherwise to generate, encrypt, checkpoint, recover, and otherwise maintain cryptographic keys for various applications. This patent application further incorporates by reference U.S. Pat. No. 9,635,011, having a first-named inventor of Paul Ying-Fung Wu, and issued for "Encryption And Decryption Techniques Using Shuffle Function;" this incorporated-by-reference patent describes several examples of techniques of generating shuffle vectors, which can optionally be applied in combination with techniques described herein to insert dummy operations at random points in a math processing sequence, and coin flipping processes, which can also optionally be applied in combination with techniques described herein.

TECHNICAL FIELD

The disclosure herein relates to performance of device, processor and integrated circuit control over circuitry, especially math circuitry, in a variable manner, so as to minimize the efficacy of side-channel attacks. The various techniques disclosed herein are especially useful in cryptographic operations.

BACKGROUND

The term "side-channel attack" refers to an attempt to identify secret information by exploiting statistical tendencies of a computer system, as contrasted with an attempt to crack an encryption protocol through trial and error. For example, a hacker can attempt to derive a secret key, a password, or other sensitive information by monitoring radio frequency emissions, power usage (or heat variation), memory access frequency, timing patterns and/or other parameters to gain statistical information about cryptographic processes and, on the basis of this information, attempt to replicate a secret key, password or other value. Note that this type of attack does not always require direct physical access to the system in question.

Conventionally, secret information (such as a private key, public key or shared secret key, and including without limitation, a password) is applied as a number, and is used to multiply values of an operand, for example, in a finite number field or using a mathematical domain with prescripted (e.g., standard or nonstandard) mathematical operations. These operations can be applied to perform encryption of the operand, decryption of the operand, hashing for purposes of authentication/verification, exchange of transaction-based or other shared keys (e.g., Diffie-Hellman key exchange and Digital Signing such as the Elliptic Curve Digital Signature Algorithm, or "ECDSA"), and other operations. Unfortunately, these cryptographic operations are amenable to side channel attacks—for example, even if these operations are performed inside a secure processor (i.e., hardware that may be destroyed or rendered useless by attempts to gain physical access), these types of operations often have statistically-correlated and externally-observable system effects, which can potentially be identified non-destructively, using side channel attacks, for example through monitoring power consumption, noise characteristics and/or timing patterns of the processor/device.

What is needed is a set of techniques, and associated hardware, for making cryptographic systems/processes resistant to side channel attacks. The present invention solves these needs and provides further, related advantages.

BRIEF DESCRIPTION OF THE DRAWINGS

FIG. 6 illustrates how symbols/characters of an input value can be processed in "left-to-right" character order.

FIG. 7 illustrates how symbols/characters of an input value can be processed in "right-to-left" character order.

Figure 1A:
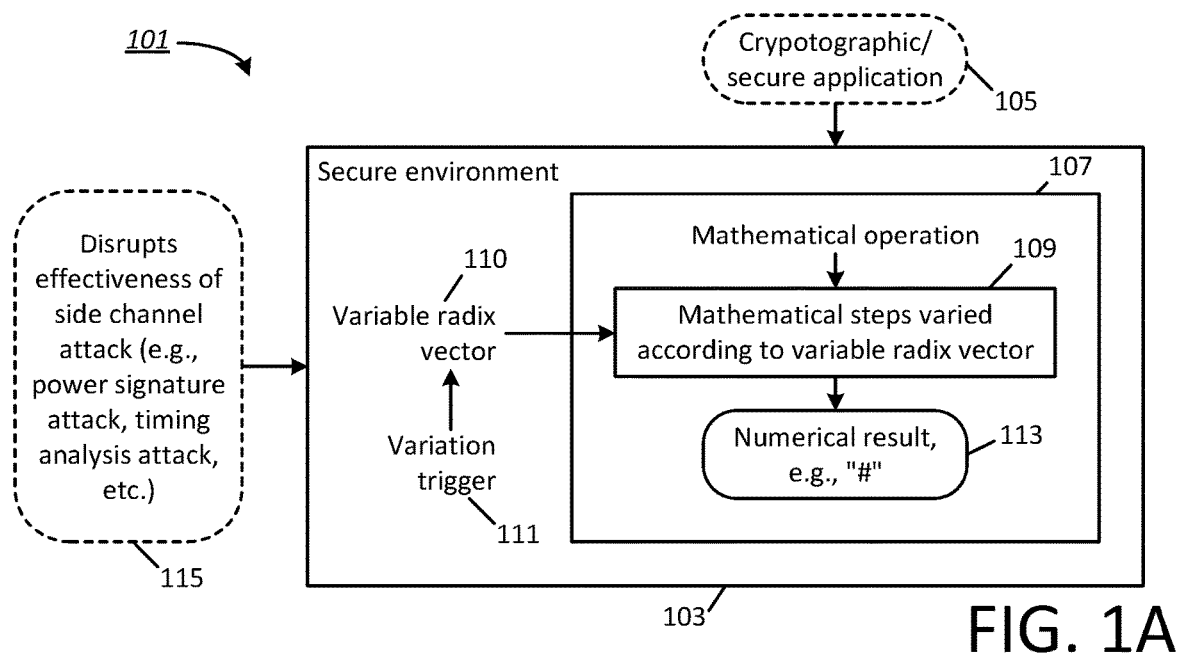
FIG. 1A is a block diagram of one embodiment of a secure environment and associated processing techniques.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques used to obtain, manage and/or use operations in a secure environment, such as in a processor or in other digital device (e.g., in a chip-card, dongle, smart phone, computer, or other digital device). In some embodiments, these techniques can be embodied as an integrated circuit or other digital device, as related methods, in the form of software (e.g., firmware) stored on physical machine readable media and adapted to control circuitry and/or as instructions stored on physical machine readable media for fabricating a chip of specific design, where the design is such that the chip or another digital device can perform methods as disclosed herein. While specific examples are presented, the principles described herein may also be applied to other methods, devices and systems as well.

DETAILED DESCRIPTION

This disclosure provides techniques for varying, in a digital device (including without limitation a processor), the sequencing with which mathematical operations are performed in hardware. The effect of this variation is to disrupt the effectiveness of certain side channel attacks, including without limitation, power signature attacks, timing attacks and/or other attacks that monitor performance and/or characteristics of a device, i.e., by disrupting the statistical characterization of those mathematical operations and of the system(s)/device(s) performing them.

In some implementations discussed below, the associative properties of mathematical operations are relied upon to vary operational sequencing. The operational sequencing is often associated with instantaneous power consumption, hence by varying order of the individual actions taken to perform one or more individual mathematical operations, the statistical manifestations of those mathematical operations (e.g., in terms of power consumption over time, or "power signature") are disrupted.

In still more specific implementations discussed below, variable radix processing techniques are applied to provide a deterministic method for automatically varying the sequencing of scripted steps to perform a mathematical operation in question. A brief example here would be helpful—if it is desired in a digital system to multiply the variable "P" by the base-10 number "29" (i.e., two "tens" and one "nine"), then conventionally, the radix of each character (i.e., "2" and "9" digits) of this numeric representation would be "ten" (i.e., ten "ones" in the right-most character spill over to the left-most character, the "tens" character, and the "tens" character would spill over to a third digit, e.g., as with the base-10 number "100"); however, in some embodiments described herein, the conventional radix of "10" is instead changed in some manner, such that a new numeric representation is generated and is used to control sequencing. For example, if a character-by-character radix, referred to herein as a "variable radix vector," is chosen to be "{3,4,3}" (i.e., instead of "{10,10,10}"), where the right-most "3" of "{3,4,3}" represents the "ones" column/symbol/character, the middle character "4" represent units of "threes" and the left-most character "3" represents units of "twelves," then the base-10 expression "29" instead becomes "212" (i.e., two "twelves" plus one "three" plus two "ones"). In some embodiments described herein, a processor/digital device and/or software comprises or implements a variable radix processor that derives a value such as this latter number "212," using a variable radix expression of some type, and then uses this converted numerical expression to control operational sequencing; the result is that the value "29*P" is still calculated as a number that is output (e.g., expressed in base-10 format or otherwise), but the power signature and other statistical tendencies of the processor/software/digital device are varied in a manner that depends on the particular radix vector. In some embodiments described herein, a variable radix vector is dynamically selected (e.g., redefined/generated) upon occurrence of a trigger, e.g., with every invocation of a mathematical process, or as initiated by software, or after a predetermined number of steps or operations, or at occurrence of some other event. Note that a variable radix vector and/or variable radix math is not required for all embodiments, and that in some implementations other mechanisms for statistical variation can instead be used. Also note that while the example just provided is in the context of multiplication, it can be applied to many other mathematical processes including without limitation division, exponentiation, logarithmic calculation, root calculation, and many other types of processes.

It should be observed that the variation discussed above relies on associative properties of math; as an example, to compute 29*P in base-10, one might calculate the values of 20*P and 9*P and add them together. Techniques discussed herein, including variable radix techniques might instead vary this process to cause a processor to calculate 24*P, 3*P and 2*P (i.e., per the hypothetical value "212") and add them together, i.e., in reliance on associative properties of addition/subtraction/multiplication/etc.; if, as a further example, a radix vector of "{64.5}" were instead used to express the base-10 number "29" as "114," for example, in a subsequent multiplication to compute the same value 29*P, and was used to consequently calculate and add together 20P, 5P and 4P, the value 29*P would still be the invariant result, but again, with a different power signature and associated timing; once again, the effect of the radix variation as applied in certain embodiments herein is to disrupt correlation between timing/power signature and the particular mathematical operation being performed, such that it becomes much more difficult for an attacker to discover the value P (or potentially other information) using side channel attacks.

In still more detailed embodiments, techniques for varying steps in performing a mathematical operation can be applied to control specific circuitry within a processor that is dedicated to performing a mathematical operation, such as (without limitation) a dedicated multiplication circuit. Note for example that in many processor designs, a specific type of circuit such as a "double-and-add" execution unit, a "square-and-multiply" execution unit, or other specific-function math hardware unit, is relied upon as the basis for math processing operations. For example, if the value 5*P is to be calculated, a double-and-add execution unit might load the value P into a first register and a second register, and then in sequence, double the value in the second register, double it again, add the first register content to the second register content (i.e., to obtain 5*P), and then output this second register content, i.e., via steps of double, double, add (i.e., "DDA"). There are similar step-by-step examples for "square-and-multiply" execution units and other types of dedicated math hardware circuits; for example, a square-and-multiply execution unit might load the value P into a first register and a second register, square the value in the second register, then square it again, multiply the first register content with the second register content and put the result in the second register (i.e., to obtain $P^5$), and then output this second register content, i.e., via the steps of square, square, multiply (i.e., "SSM"). In many of the embodiments described below, the operations of these types of circuits generally are specifically varied in terms of their scripting/sequencing to effectively scramble the correlation between instantaneous power consumption (and/or other statistical tendencies) to secret information, such as the operands 5 and P being processed. Note that these techniques can be optionally combined in some embodiments with variable radix processing to powerful effect, e.g., a variable radix processor can be used in concert with varied sequencing of a circuit such as a double-and-add execution unit or a square-and-multiply execution unit, such that the steps of the latter are scripted automatically in response to a variable radix vector and change with each new variable radix vector.

In still other embodiments, dummy operations (e.g., using dedicated dummy circuits or other circuitry) and/or varied character order processing can also be injected into a scripted operational sequence to provide further entropy.

It should be appreciated that these techniques generally, used in any desired combination, can be applied to deter side channel attacks in digital systems generally.

Other groups of embodiments will further be introduced below or will otherwise be apparent from the description below, many of which use still more specific features and other optional variations in addition to and, in some cases instead of, the techniques generally discussed above. These various embodiments and their various features can optionally be employed together, individually, or in any desired permutation or combination. In one optional implementation, the various embodiments described herein can be combined to provide for a secure processor chip, where that chip includes circuitry to use and or apply a cryptographic key or other secret, and to provide for a myriad of secure processing functions.

Specifically contemplated implementations can include "hardware logic," "circuits" or "circuitry" (each meaning one or more electronic circuits). Generally speaking, these terms can include analog and/or digital circuitry, and can be special purpose in nature or general purpose. For example, as used herein, the term "circuitry" for performing a particular function can include one or more electronic circuits that are either "hard-wired" (or "dedicated") to performing the stated function (i.e., in some cases without assistance of instructional logic), and the term can also include a microcontroller, microprocessor, FPGA or other form of processor which is general in design but which runs software or firmware (e.g., instructional logic) that causes or configures general circuitry (e.g., configures or directs a circuit processor) to perform the particular function. Note that as this definition implies, "circuits" and "circuitry" for one purpose are not necessarily mutually-exclusive to "circuits" or "circuitry" for another purpose, e.g., such terms indicate that one or more circuits are configured to perform a function, and one, two, or even all circuits can be shared with "circuitry" to perform another function (indeed, such is often the case where the "circuitry" includes a processor). As implied above, "logic" can include hardware logic, instructional logic, or both. Instructional logic can be code written or designed in a manner that has certain structure (architectural features) such that, when the code is ultimately executed, the code causes the one or more general purpose machines (e.g., a processor, computer or other machine) each to behave as a special purpose machine, having structure that necessarily performs described tasks on input operands in dependence on the code to take specific actions or otherwise produce specific outputs. Throughout this disclosure, various processes will be described, any of which can generally be implemented as instructional logic (e.g., as instructions stored on non-transitory machine-readable media or other software logic), as hardware logic, or as a combination of these things, depending on embodiment or specific design. "Non-transitory" machine-readable or processor-accessible "media" or "storage" as used herein means any tangible (i.e., physical) storage medium, irrespective of the technology used to store data on that medium or the format of data storage, e.g., including without limitation, random access memory, hard disk memory, optical memory, a floppy disk, a CD, a solid state drive (SSD), server storage, volatile memory, nonvolatile memory, and other tangible mechanisms where instructions may subsequently be retrieved by a machine. The media or storage can be in standalone form (e.g., a program disk or solid state device) or embodied as part of a larger mechanism, for example, resident memory that is part of a chip-card, dongle, laptop computer, portable device, server, network, printer, or other set of one or more devices; for example, such media can comprise a network-accessible device or something that is selectively connected to a computing device and then read. The instructions can be implemented in different formats, for example, as metadata that when called is effective to invoke a certain action, as Java code or web scripting, as code written in a specific programming language (e.g., as C++ code), as a processor-specific instruction set, or in some other form; the instructions can also be executed by the same processor, different processors or processor cores, FPGAs or other configurable circuits, depending on embodiment. Throughout this disclosure, various processes will be described, any of which can generally be implemented as instructions stored on non-transitory machine-readable media. Also depending on implementation, the instructions can be executed by a single computer and, in other cases, can be stored and/or executed on a distributed basis, e.g., using one or more servers, web clients, or application-specific devices.

Each function mentioned in reference to the various FIGS. herein can also be implemented as part of a combined program or as a standalone module, either stored together on a single media expression (e.g., single floppy disk) or on multiple, separate storage devices. "Module" as used herein refers to a structure dedicated to a specific function; for example, a "first module" to perform a first specific function and a "second module" to perform a second specific function, when used in the context of instructions (e.g., computer code), refer to mutually-exclusive code sets. When used in the context of mechanical or electromechanical structures (e.g., an "encryption module") the term "module" refers to a dedicated set of components which might include hardware and/or software. In all cases, the term "module" is used to refer to a specific structure for performing a function or operation that would be understood by one of ordinary skill in the art to which the subject matter pertains as a conventional structure used in the specific art (e.g., a software module or hardware module), and not as a generic placeholder, "nonce" or "means" for "any structure whatsoever" (e.g., "a team of oxen") for performing a recited function (e.g., encrypting a private key). "Hardwired" as used herein refers to implementation of a function as part of an inherent hardware design, i.e., such can be "built into the architecture;" this term encompasses situation where special purpose circuitry is necessarily designed to operate a certain way, as opposed to receiving some type of variable configuration. "Multistable" as used herein refers to an object (e.g., a circuit) having two or more stable states; "bistable" as used herein refers to an object (e.g., a circuit) having two stable states, i.e., a bistable circuit is one type of multistable circuit. "Metastable" as used herein refers to a circuit or condition that is unstable for a period of time and that then resolves to one of several stable states. The "multistable" and "bistable" circuits described herein are also "metastable circuits." Generally speaking, these circuits will have an unstable state or condition, where that state or condition at some point decays and necessarily assumes an (at least in theory) an unpredictable one of its stable states following a period of time of uncertainty in which 'stable' decay or damped oscillations take place; generally speaking, in some (but not necessary all) cases, these circuits involve some type of a race condition, the output of which is hard to predict or replicate based on knowledge of the circuit's general design. For example, a bistable (metastable) circuit as disclosed herein might have an output ("Q") that in theory is unpredictable when the circuit is excited, but which will assume a "0" or "1" logic state. In theory, upon excitation, such a circuit should assume a logic "1" output sometimes and a logic "0" output at other times, but in practice, due to manufacturing process corners, specific instances of such a bistable circuit may tend to produce a logic "1" output more often than not, or conversely, a logic "0" output more often than not. Note that while bistable circuits are discussed in various embodiments below as a special case of multistable circuits, it is contemplated that the techniques herein are generally applicable to multistable circuits having more than two stable output states (e.g., three, four, five, or indeed, any number of stable output states as long as an excited condition yields a theoretically unpredictable output given a general circuit cell design). In connection with various embodiments herein, the term "device" refers to an electronic product (e.g., based in, but not limited to, a chip, system, or board) with circuitry and possibly resident software or firmware; examples of a device include, without limitation, a chip-card, a dongle, a smart phone, a computer, a server, an integrated circuit, and other manifestations. The term integrated circuit ("IC") typically refers to a die, packaged or otherwise, and, as stated, an IC can also be a type of device. "Dummy operations" or "dummy executions steps," as used herein refers to operations that are undertaken to consume power or otherwise produce externally observable statistical effects in a way that does not substantively contribute to a calculation being performed in circuitry; in some embodiments, these operations/steps can be performed using circuitry dedicated to creating noise that obscures externally-observable statistical characterizations of a math operation or processing circuit, while in other embodiments, the same circuitry used for processing of input operands can be used, but in a manner that inserts additional operations that do not vary the result produced by the math processing circuit. A "radix vector," as used herein, refers to a set of two or more elements that each define a radix (e.g., base-10) for an associated numeric digit. A "radix number space," "radix space" or "radix numerical space" refers to a number format with characters/symbols as prescribed by an associated radix vector; for example, using the exemplary radix vector of "{3,4,3}" discussed above, the decimal number "29" instead becomes "212" in the radix number space.

Other definitions will be apparent from the discussion in this disclosure of techniques and their associated implementations.

Figure 1B:
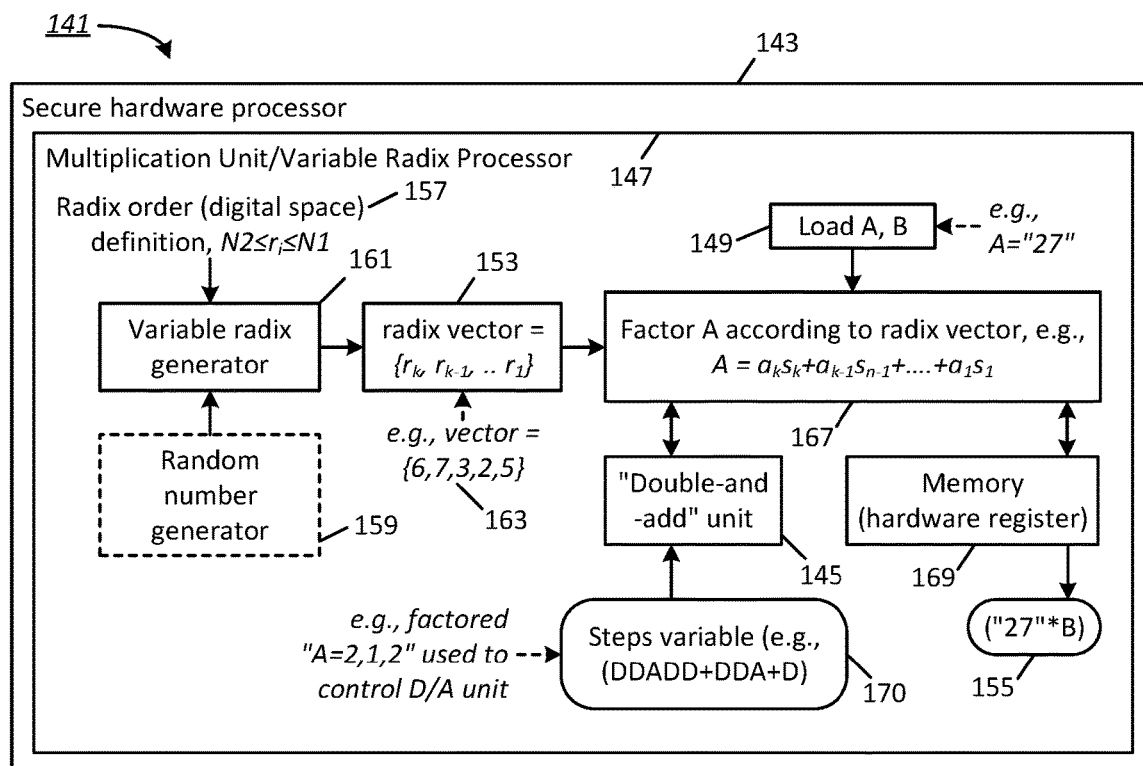
FIG. 1B is a block diagram of one embodiment of a secure processor and/or variable radix processor and associated techniques.
Figure 1C:
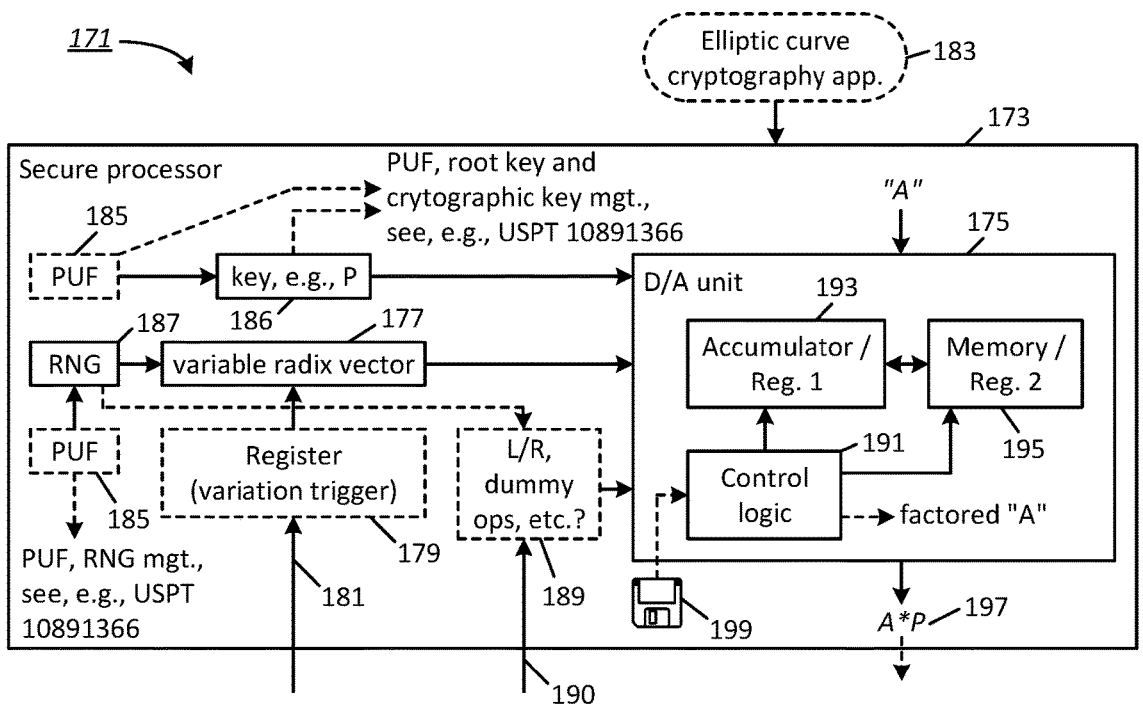
FIG. 1C is a block diagram of one embodiment of a secure processor and associated techniques.

This disclosure will roughly be organized as follows: FIGS. 1A-1C will be used to discuss several introductory embodiments. FIGS. 2A-3B will be used to discuss some optional, general processing techniques and provide some simple examples that will aid in the discussion of the variable radix process. FIGS. 4-8 will be used to discuss specific functional sequences that are used in more detailed embodiments. Finally, FIG. 9 will be used to discuss an additional example of a circuit embodiment.

FIG. 1A illustrates principles associated with a first embodiment 101 of the techniques introduced above. The techniques are advantageously practiced in a secure processing environment 103, that is, where it is desired to reduce effectiveness of a "side channel attack" which attempts to discover secret information, such as through statistical analysis. As indicated by numeral 105, these techniques can advantageously be applied to cryptographic processes, such as might be employed by software (e.g., an application or operating system) operating on a digital device (for example, a computer, smart phone, smartcard/chip-card, dongle, embedded device, network, or other digital system). The depicted embodiment, however, is not limited to cryptographic applications or to software. As indicated by numeral 107, a mathematical operation will be performed within the secure environment 103; to minimize the effectiveness of a side channel attack, the steps of the mathematical operation are varied and/or scrambled, 109, using a variable radix vector, 110. The variable radix vector can be occasionally changed or varied, optionally on every single instance of invocation, such that the way in which mathematic operations 107 are performed is also thereby varied, that is, while still producing the same result, 113. Note that, in some embodiments described herein, the variable radix vector 110 is changed for each new mathematical operation; however, this is not required for all embodiments and, in other embodiments, the variable radix vector can optionally be changed infrequently or not at all (e.g., it can be varied from device-to-device or application-to-application). In a typical embodiment, the variable radix vector is changed frequently so as to substantially reduce the effectiveness of even sophisticated side channel attacks. As indicated by numeral 111, a variation trigger can optionally be programmably defined, randomly generated, externally provided, or set in some other manner to trigger a new variable radix vector at a desired event. Note again that, as indicated by numeral 113, the numerical result (represented generically by the variable "#" in the FIG.) is always the same for a given set of input numerical values to be processed (e.g., multiplied together), regardless of the values of the individual elements of the particular variable radix vector which is used. As represented by numeral 115 at the left-hand side of the FIG., the effect of this operational-variation imparted by the variable radix vector 110 is to dramatically minimize the effectiveness of a power signature and/or timing analysis attack.

For example, it was noted earlier that power signature attacks can be employed to derive cryptographic keys. With today's hardware-computation capabilities, simple power/timing analysis and differential/statistical power/timing analysis attacks are already practical, and future progress toward quantum computing is expected to increasingly facilitate the ease with which these types of attacks can be performed. By varying the way in which routine computations are performed (e.g., effectively relying on associative properties of computing mathematical operations, and changing sequencing of those operations), the techniques described herein cause instantaneous power consumption to vary, thereby decreasing the statistical correlation between power consumption over time and a secret value maintained by a system (e.g., a cryptographic key), and thereby impeding effectiveness of power signature and/or timing analysis attacks (and potentially other side channel attacks as well).

Some embodiments described below specifically call for varied control over "double-and-add" execution units conventionally used by many hardware processor designs. It is noted that these steps employed by these embodiments can generally be converted one-for-one to designs that deploy "square-and-multiply" execution units, e.g., for computing power modulo or modular exponentiation for large numbers, e.g., so-called "BigIntegers." These types of execution units are commonly used to perform basic mathematical operations in digital devices, for example, multiplication and/or division and/or exponentiation. By varying the sequencing of the mathematical steps employed by a hardware execution unit, such as a double-and-add execution unit or square-and-multiply execution unit, these embodiments scramble the power signature of such an execution unit relative to time. As a very simple example, and to illustrate the theory associated with this principle, computation of the value "5x," assuming an input of x, can be sequenced in a number of different ways by a double-and-add execution unit; consider that each of the following operations in Table 1 (below) all result in computation of the value "5x."

TABLE 1 x + x + x + x + x
(2*x) + (2*x) + x
x + (2*x) + x + x
2*(2*x) + x
etc . . .

Similarly, if $x^5$ is to be computed, this can be processed by sequences such x*x*x*x*x, $(x^2)*(x^2)*x$, $((x^2)^2)*x$, and so on. Because the execution unit has different instantaneous power consumption depending on whether it is performing shifting (e.g., loading/resetting), doubling, or adding values together, squaring, multiplying, etc., each of the different operations referenced above causes the execution unit to exhibit a different power profile relative to time (e.g., microprocessor clock cycles). As should be apparent, there are many ways (not limited to those shown) in which the value "5x" can be computed, even with operations restricted to simply doubling an input (x) and adding an input (x) to an accumulated result; there also exist many ways (not limited to those discussed) that will produce $x^5$ as an accumulated result. Because the power consumption of the execution is different for each type of operation, each different sequence of processing steps exhibits a different power consumption profile, that is, even though each of these sequences will invariably yield the same ultimate value (5x or $x^5$) as an output.

FIG. 1B shows another embodiment 141; this embodiment features a secure hardware processor 143 having an internal double-and-add execution unit 145. The double-and-add execution unit 145 is seen to be part of a hardware multiplication unit 147. In this example, the hardware multiplication unit will, from time-to-time, be provided with two values that are to be multiplied together to obtain a numeric result; in the FIG., these values are represented by the register function "load A,B" (numeral 149); per numeral 151, in an example to be discussed below, the value "A" can be a number such as the hypothetical number "27," that is to be multiplied against digital value "B," which can be any number (but in some embodiments, as discussed below, will be a cryptographic key, e.g., a 256-bit key), or any two-dimensional or higher dimensional curve point (x,y, . . . z) on a designated elliptic curve or lattice, where x, y . . . z are each, for example, a 256-bit number in a finite field. As with the techniques generally discussed earlier, a variable radix vector 153 will be provided and used to determine sequencing order of mathematical operations performed by secure processor 143, in order to compute the result of "27" times "B" (which is symbolically represented in the FIG. as "27*B," per numeral 155). Note that by extension, while illustrated for multiplication and/or exponentiation, these techniques can be applied to other mathematical operations including for example division, logarithmic, and other functions, without limitation.

In this example, the variable radix vector will be used to determine the order of control and sequencing of the "double-and-add" execution unit 145 to perform calculation of the quantity "27*B" depending on the specific values {$r_k$, $r_{k-1}$, . . . $r_1$} of the variable radix vector, 153; in contemplated alternatives, the variable radix vector 153 can be applied to script execution steps of other dedicated math circuit types, such as for example, and without limitation, a "square-and-multiply" execution unit (e.g., for example, which computes $B^A$, such as $B^{27}$).

In the depicted embodiment, a fresh radix vector 153 is generated by a variable radix generator 161 for each new mathematical operation to be performed, e.g., each new multiplication between an input operator ("A") and a digital value (e.g., "B"). Each element, or character, of the variable radix vector 153 can be generated on the basis of a seed from a random number generator 159. Each element or character of the variable radix vector defines a radix to be applied for one digit of a factorization of the input operator "A." A radix may be thought of as the number base used to weight a numerical value for a given digit of the input operator; for example, the base-ten (decimal) expression of the hypothetical input multiplicand "27" has two digits, "2" and "7" where the digit "2" denotes the number of tens and the value "7" denotes the number of ones, to be added to the number of tens. In base-16, this same value ("27" decimal) would be expressed as "18" (i.e., the "1" character denotes the number of sixteens, and represents that there is one sixteen, and the second character "B" is equivalent to the decimal number 11 and represents that there is a remainder of "11" to be added to the single sixteen); in base-2, this same decimal value ("27") would be expressed as "11011," i.e., denoting one sixteen, one eight, one two and one one, or 16+8+2+1=27. In these respective examples, when an individual element of the radix vector has a value of "10," this denotes base-10 math; by contrast, in embodiments herein, the radix of all of or any subset of these individual elements (e.g., each individual element) can be varied, e.g., it can be "16" for hex (i.e., base-16), "2" for binary (base-2) or, indeed, any other desired number (e.g., "25"), varying element-by-element if desired.

In accordance with the embodiment depicted in the FIG., a radix order or maximum radix value is typically first defined for one or more individual elements of the variable radix vector, per numeral 157; this reference numeral indicates that, in this embodiment, each individual element of the radix vector has a range extending between "N1" and "N2," e.g., the corresponding element of the radix vector can any possible value within this range (e.g., as seeded from the random number generator 159). For purposes of discussing this embodiment only, the value N1 will be exemplified as having a value of "9" and the value N2 will be exemplified as having a value of "2," though again, any number range can be used. Note that, optionally, the range can be fixed or hardwired in some embodiments, or imputed from circumstance, and in still other embodiments, it can be programmably varied (e.g., with each new radix vector generation or otherwise). For purposes of FIG. 1B, it is assumed that the range of each element of the radix vector, i.e., each symbol or digit, is always between "2" and "9," and that a value in this range is chosen for each element of the variable radix vector. The variable radix vector is typically generated such that, given its constituent elements and their values, the number space defined by the radix vector necessarily encompasses the entire set of possible multiplication values that can be received by the multiplication unit 147 as an input operator (i.e., the multiplier "A").

In one application, the techniques disclosed herein can be applied to elliptic curve cryptography, where a value n*P is to be calculated; in the context to the examples discussed above, the input operator (multiplicand) "A" of FIG. 1B can be "n" and the digital value "8" of FIG. 1B can be "P." In this example, the digital value "P" is a two-dimensional basis vector that is one instance of an elliptic curve point, and the value "n" is an input scalar multiplier. The system is thus to mathematically calculate the value A*8=n*P in this example. If it is hypothetically assumed that "n" can have any numerical value between 0 and $2^{256}-1$, (subject to modulo N, the result of which will be capped to an upper limit that is a small delta away from the maximal $2^{256}-1$, where N is the order of the particular elliptic curve chosen and is typically a whole number that is very close to $2^{256}$), then the radix vector must have enough elements to represent this entire numerical range.

Another example here might be helpful; numeral 163 illustrates a hypothetical radix vector {6,7,3,2,5}, i.e., where every individual element of the vector is between the values of "2" and "9." This expression denotes that the input multiplier "n" expressed can have any numeric value between "0" and "1259." That is, an input multiplier will have five digits, where the least-significant (e.g., right-most) digit represents "ones" and has a range of 0-4, where the second least-significant digit represents "fives" and has a range of 0-1, where the third-least significant digit represents "tens" and has a range of 0-2, where the second most-significant digit represents "thirties" and has a range of 0-6, and where the most-significant digital represents "210s" and has a range of 0-5. The entire number space representable by these five digits in this variable radix space {6,7,3,2,5} is therefore 0-1259 (i.e., 6×7×3×2×5−1). If it were desired to have a useable number space of $2^{256}$ to service all possible input multiplicand values, then assuming a maximum radix vector element range of 2-9, a radix vector having 256 elements might typically be generated (i.e., assuming the 'worst case' in which each radix vector element could be selected to be "two," corresponding to binary digits). Again returning to the example of the hypothetical variable radix vector of {6,7,3,2,5}, if it were desired to express the decimal value "27" using this particular variable radix representation, the radix numerical expression would be "212" (i.e., 2*(10)+1*(5)+2*(1)=27); if it were instead desired to express the decimal value "807" using this particular variable radix representation, the expression would instead be "35212" (i.e., 807=3*(210)+5*(30)+2*(10)+1*(5)+2*(1)). Note that if a different variable radix vector were applied for purposes of mathematical operations, these expressions would each be different. For example, if the variable radix vector {3,8,4,2,7} were generated and applied, then the LSD (least-significant digit) would be "ones," the second LSD would be "sevens," the third LSD would be "fourteens," the fourth LSD would be "56s," and the fifth LSD would be "448s," with the expressible number range consisting of the decimal multiplier range of 0-1343; using this radix vector, the decimal value "27" is expressed as "116" in the radix number space (i.e., 1*(14)+1*(7)+6*(1)=27) and the decimal value "807" is expressed as "16112" (i.e., "1*(448)+6*(56)+1*14+1*(7)+2*(1)=807). These alternative, hypothetical radix vectors of {6,7,3,2,5} and {3,8,4,2,7} will be used again below as examples.

In this embodiment, once the variable radix vector is generated, an input multiplier (e.g., "A") is then factored, per numeral 167, into a value having individual symbols corresponding to the variable radix number space (e.g., corresponding to variable radix vector {6,7,3,2,5} or {3,8,4,2,7}). The factorization of "A" is performed to give the expression "A=$a_n s_n + a_{n-1} s_{n-1} \ldots + a_1 s_1$," where:

$s_k = \Pi(r_{k-1} \ldots r_1)$, where $k \geq 1$ and where $s_1=1$.

The characters of this factored value are then applied to variably control sequencing of the double-and-add execution unit 145. For example, once again assuming that "A"=27 (decimal), per the example just given, these alternate hypothetical radix vectors {6,7,3,2,5} or {3,8,4,2,7}) yield corresponding, alternative expressions of 212 or 116 as a factored version of "A"; where the hypothetical radix vector {6,7,3,2,5} is used (RV={$r_5, r_4, r_3, r_2, r_1$}={6,7,3,2,5}), the value 27 is expressed as "212," where "27=2*$s_3$+1*$s_2$+2*$s_1$, where $s_1$=1, $s_2$=5*1, and $s_3$=2*5*1=10. Each of these symbols or terms is used to control the double-and-add execution unit 145 to effectively calculate the value 27*B (represented by numeral 155); this value is stored in a memory 169, such that it can be output by the multiplication unit to other parts of the processor 143, to other circuits external to the processor, or for remote transmission.

Note the effect of the factorization and the variable radix math is to sequence actions of the double-and-add execution unit 145 on a variable basis. For example, again using the hypothetical value of "212" and the variable radix vector of {6,7,3,2,5}, control logic (not shown) calculates a multiplication value digit-by-digit; the first digit of "212," i.e., "2" is a "tens" digit, and control logic in this embodiment sequences the double-and-add execution unit to calculate the value of 20*B. As indicated by reference numeral 170, to obtain this result, the system can load the value "8" into a register and double it, double it again, add the value B again, double it, and then again double it (e.g., (B*2*2+B)*2*2=20*B); this is represented within box 170 by the mnemonic "DDADD." This value is temporarily stored in memory (e.g., a hardware register), and the second digit is then calculated as 5*B (e.g., B*2+B), again, with the steps of the double-and-add execution unit being controlled as a function of the "fives" digit (i.e., the "1" in the expression "212"). This second term (5*B) is calculated as "DDA," and is then also added to the memory (i.e., 20*8+5*8=25*8). Note the addition operation of/between the first two terms contributes one substantive unit corresponding to mnemonic "A" to the power and timing signature. Finally, the third term of 2*B is calculated as D (B*2=2B), and this value is, similarly, added to the memory to obtain the output 27*B (i.e., contributing another substantive unit corresponding to mnemonic "A" to the power and timing signature).

Note that, because power used by the multiplication unit at any one time is dependent on whether doubling or adding (or another operation such as shifting) is being performed, by varying the way the multiplication sequence is performed, the power signature and/or timing of these processes can be effectively scrambled.

While this variation just discussed has the effect of scrambling the power signature and/or other statistical effects of math operations performed, a random symbol calculation order such as implied in this example is not necessarily the most power-efficient or time-efficient process, as computation of individual terms, on a symbol-by-symbol basis, might result in duplication. In some embodiments, therefore, to make this process more efficient, hardware can advantageously apply a strict left-to-right or right-to-left symbol/character processing order, in a manner that reduces and/or removes unnecessary duplication; processes for effectuating these efficiencies will be discussed further below in reference to FIGS. 3A and 6-8. Note that optimal processing efficiency is not necessarily preferred for all embodiments, e.g., in some implementations, a designer might desire to implement added entropy for power signature/timing obfuscation that be obtained via the use of a completely random (i.e., highly-varied) symbol processing order.

It should be again noted that many of the elements described in connection with the embodiment of FIG. 1B are not required for all embodiments. For example, the described techniques can be applied with or without dynamic variable radix vector generation (e.g., a radix vector can be programmed, hardwired, inferred, or obtained in some other manner), and/or a variable radix vector instead can be used to vary math sequencing based on some other usage of associative mathematical properties. To cite another example, circuits other than multiplication units and/or double-and-add and/or square-and-multiply execution units can be managed using a subset or all of the basic principles described above, some other basis for process variation can be used in some embodiments in place of a variable radix vector. Accordingly, the described techniques should be understood to each be optional, depending on embodiment.

FIG. 1C shows yet another embodiment 171 for implementing some or all of the techniques described above. A secure processor 173 once again includes a "double-and-add" execution unit (D/A Unit) 175, and circuitry to define variable radix vector 177. The secure processor is a type of microprocessor, field-programmable gate array ("FPGA") or other circuitry which is designed in a manner such that attempts to physically discover the operations of the integrated circuit result in destruction of, or un-usability of, the circuit in question, i.e., the circuitry is designed to inhibit probing or other direct discovery of its sequence of operations, including with limitation through cutting into the integrated circuit. For purposes of discussing this FIG., it will once again be assumed that each element of the radix vector falls within the numerical range of 2-9, though once again other numerical ranges for each radix vector element can be used; once again also, the variable radix vector 177 is generated to define a large enough numeric space to encompass all possible input operands, e.g., any number within the entire numerical range that is expected for multiplication.

Per dashed-line block 179, in some embodiments, a trigger 179 to regenerate (i.e., change) the maximum range and/or the variable radix vector can be dynamically provided (e.g., at expiration of a predetermined time, or occurrence of a predetermined event, or externally supplied as indicated by external arrow 181); in the depicted embodiment, trigger variation is optional and it is assumed for purposes of discussion that a fresh radix vector will be generated for each new mathematical operation (e.g., multiplication) and that each element of the radix vector will be a random number between "2" and "9."

In this embodiment, the mechanism for generating the variable radix vector is a hardware-based physically-unclonable function, or "PUF," that is configured as an array of many metastable circuits. One or more such arrays are referenced in the FIG. by numeral 185, e.g., including a first PUF array to serve as the basis for generating a cryptographic key 186 and optionally a second PUF array to drive a random number generator (RNG) 187; a single array can be used for all purposes, or alternatively, other means for driving a random number generator and/or to serve as a basis for a hardware key can be used. Each metastable circuit in a PUF array is supposedly identical, but statistical variation associated with fabrication process corners cause individual ones of the metastable circuits to behave in a non-ideal manner. When there is a large array of such circuits, such as represented in this FIG., the individual metastable circuits that behave non-ideally can form a type of device fingerprint, used as the basis for a hardware cryptographic key. Such an array (e.g., of hundreds to thousands, or more, of such metastable circuits) can provide an identifier for each individual integrated circuit made by a supposedly common design that is, statistically speaking, very unlikely to be replicated, even if many millions of such integrated circuits are made. As taught in our incorporated-by-reference patent, U.S. Pat. No. 10,891,366, a PUF array can also be used not only to provide a unique device ID or key (e.g., per numeral 186), but it can also serve as the basis of a random number generator (RNG), e.g., RNG 187. As will be noted further below, a random number seed from the RNG 187 can also be used to impart other types of variability, such as character processing order or insertion of dummy operations (each to be described below).

The variable radix vector, once generated, is provided to the D/A execution unit 175, where control logic 191 will convert "A" to a variable-radix-based expression format (e.g., having multiple symbols) and will factor "A" to derive an execution sequence for the D/A execution unit, as has been previously discussed. As indicated by block 189, optional features, can also be specified to control logic 191 including whether a particular symbol processing order is to be used in multiplying symbol values of "A" in the radix space against a digital value (e.g., the basis vector P, 186). Without limiting the type of character ordering that can be supported, FIG. 1C explicitly indicates that a "left-to-right" or "right-to-left" symbol order can be specified to the control logic, as can a minimum or fixed number of D/A execution steps; each of these options presents certain advantages that will be further discussed below. These options can be supported, with an input from the RNG 187 used to vary option selection and/or value, or alternatively, external programming or input, per numeral 190, can be used to selectively control and/or turn on/or off these functions, or specify their values.

Note also that while these examples show use of radix vectors that feature element-to-element variation in the radix math, there are many different variations that are all contemplated by the techniques presented by this disclosure that do not. For example, it is possible to vary the radix math only between multiple element subsets of the Radix vector, e.g., "9,9,9,5,5,5" and/or to vary the radix in some other manner (e.g., "F,9,F,9,F,9," using a hex-based notation). All such variations, and others, are contemplated by this disclosure. In the depicted embodiment, each element is independently varied based on a call to, and return from, random number generator circuitry (e.g., each call returning an element value of "2-9").

As indicated by a dashed-line call-out 183 at the top of the FIG., in one embodiment, the depicted operations can be performed for elliptic curve cryptography applications, that is, to multiply the coordinates of a point on an elliptic curve corresponding to a private or public key or simply a designated basis vector for purposes of encryption/decryption/digital-signing/key-agreement of an operand; the digital value "P" in this FIG. represents such coordinates and the numerical operator "A" represents a secret (e.g., typically functioning as a private key that can either be a static entity or an ephemeral entity) that is to serve as a scalar multiplier with the digital value "P" so as to calculate the result "A*P;" as is well known, such a process can be performed in conjunction with elliptic curve processing techniques, e.g., for performing Diffie-Hellman key exchange, with an associated value being output, per reference numeral 197.

With a radix vector being defined, and the input multiplier "A" being factored to multi-character value as expressed in the numeral space defined by the radix vector, the control logic 191 of the D/A execution unit 175 is then scripted to control the performance of double-and-add operations, e.g., using an accumulator (first register 193) and a memory (second register 195); these, and other hardware registers, may be used in support of the various processing steps as described herein, with respect to this or other embodiments. The value of each character or symbol of the expression of "A" in the radix numerical space is first calculated—continuing with the example where a digital value (e.g., elliptic curve coordinate "P") is to be multiplied by "A," and where "A" has been factored to 3*(210)+5*(30)+2*(10)+1*(5)+2*(1) on the basis of hypothetical radix vector RV={6,7,3,2,6}, the control 191 logic, in one embodiment, can perform a sequence of inverse operations according to predetermined rules in order to identify the double-and-add execution sequence that will be used for multiplication of each term of this expression. For example, the control logic can follow an iterative process where, for example, it identifies value of the "next" character, divides that value by "two" if it is even and subtracts "1" if it is odd, until the value "1" is reached, recording each step in this iterative process in order. For example, applying these principles to this example, the term value "3*210" can be processed to yield a sequence of "3/5" (630 is Divided by 2), "314" (1 is Subtracted), "157" (314 is Divided by 2), "156" (1 is Subtracted), "78" (Divide by 2), "39" (Divide by 2), "38" (1 is Subtracted), "19" (Divide by 2), "18" (1 is Subtracted), "9" (Divide by 2), "8" (1 is Subtracted), "4" (Divide by 2), "2" (Divide by 2) and "1" (Divide by 2); software, firmware or hardware logic is scripted to perform this sequence identification "DSDSDDSDSDSDDD" (where "D" means divide and "S" means subtract), and then to invert the sequence, substituting "A" (additions) for "S" (subtractions), to obtain the reverse order sequence "DDDADADADDADAD." By taking the digital value "P" and subjecting it to this sequence of double-and-add operations, one thereby obtains the value "630*P." The control logic 191 controls the accumulator 193 (i.e., a first register) to calculate each term of the multiplication operation (e.g., "630*P=3*210*P", "150*P=5*30*P", "20*P=2*10*P", "5*P" and "2*P=2*1*P") in the desired term-order, and then uses the depicted memory 195 (i.e., a second memory) to add these terms together; the result, irrespective of the radix math applied, is the desired value "A*P"="807*P" which can be consumed on-chip or output externally, depending on application, as indicated by numeral 197. Note that as indicated earlier, functions can be performed either using dedicated hardware logic, or general purpose hardware circuits controlled by instructions on physical storage media, e.g., software or firmware; the optional presence of software/firmware is symbolically represented by a floppy disk icon 199 (i.e., denoting some type of physical memory device). Note again that, to effectively compute in-time the cumulative radix-position weighted terms such as, for example, "210*P", "30*P", "10*P", "5*P" and "1*P," instead of performing computing for each character separately, one may choose to implement either left-to-right stepping or right-to-left stepping, or a combination of the two, as will be described further below; such an approach is not only efficient but is also practical/realizable in terms of hardware design.

Figure 2A:
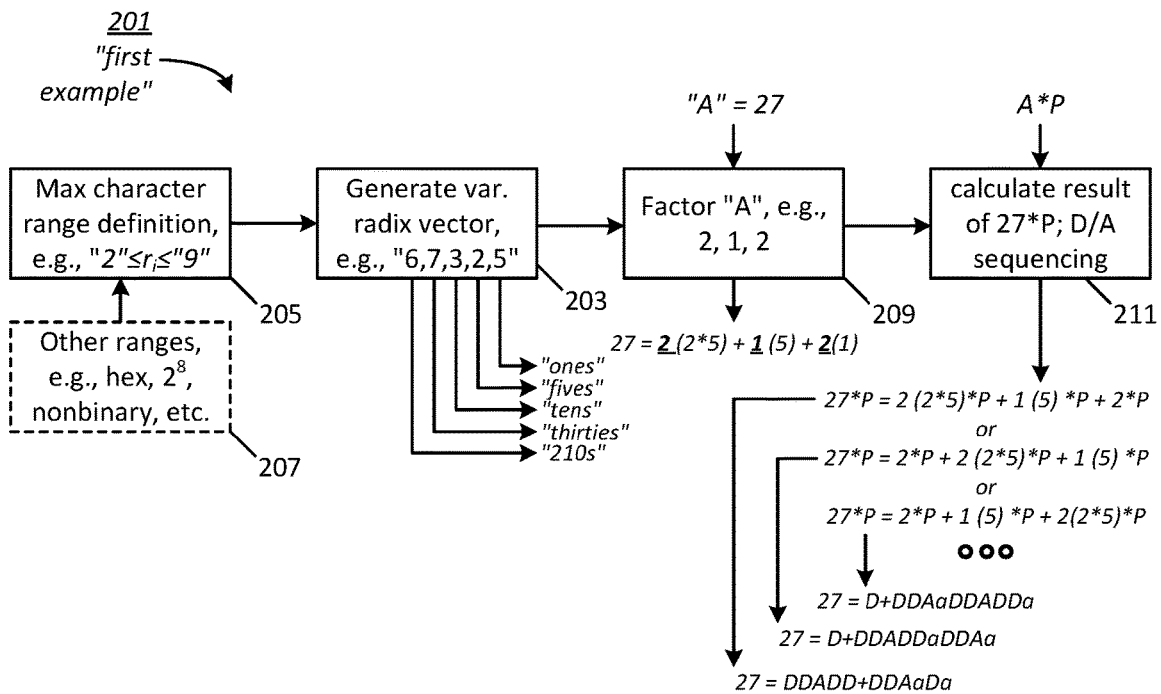
FIG. 2A is a block diagram showing one example of how techniques and structures described herein might be applied, e.g., in controlling a "double-and-add" execution unit or other dedicated math processing circuit.
Figure 2B:
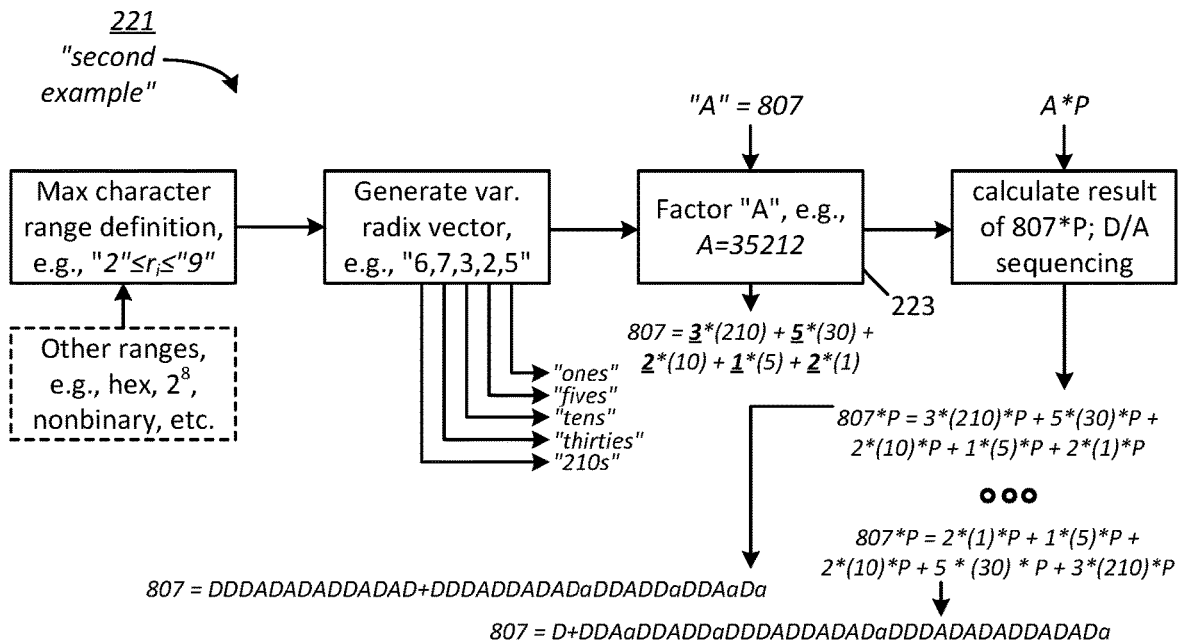
FIG. 2B is a block diagram showing one example of how techniques and structures described herein might be applied, e.g., in controlling a "double-and-add" execution unit or other dedicated math processing circuit.
Figure 2C:
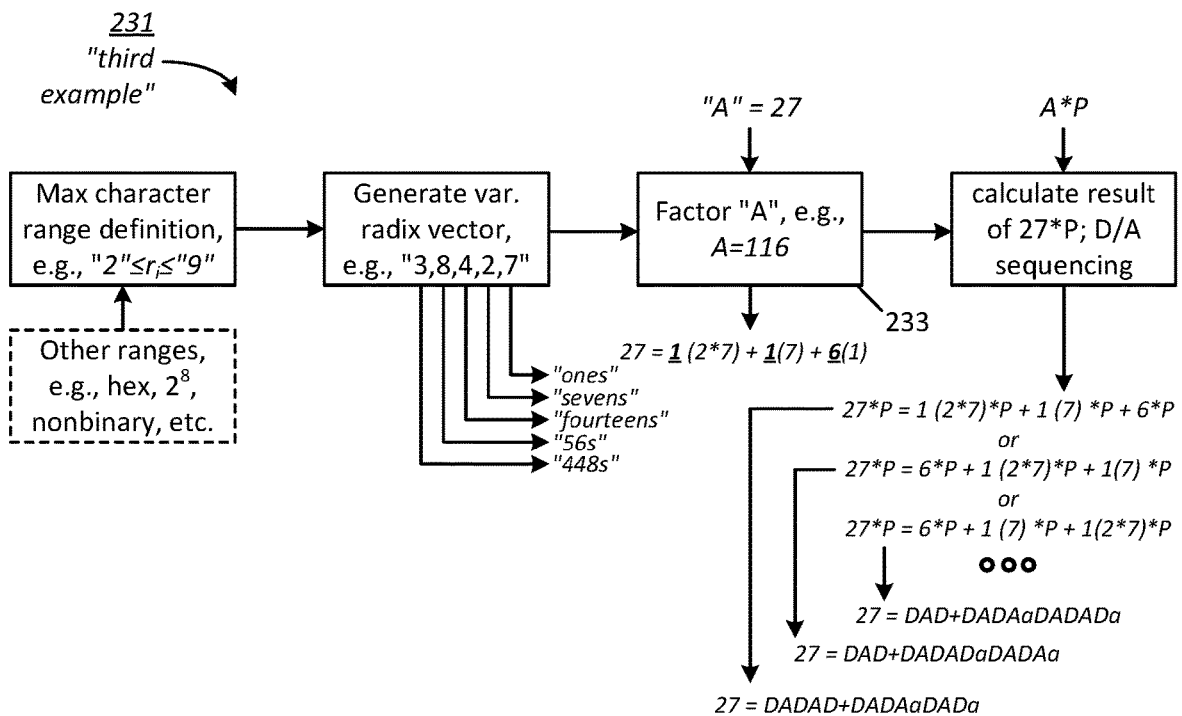
FIG. 2C is a block diagram showing one example of how techniques and structures described herein might be applied, e.g., in controlling a "double-and-add" execution unit or other dedicated math processing circuit.
Figure 2D:
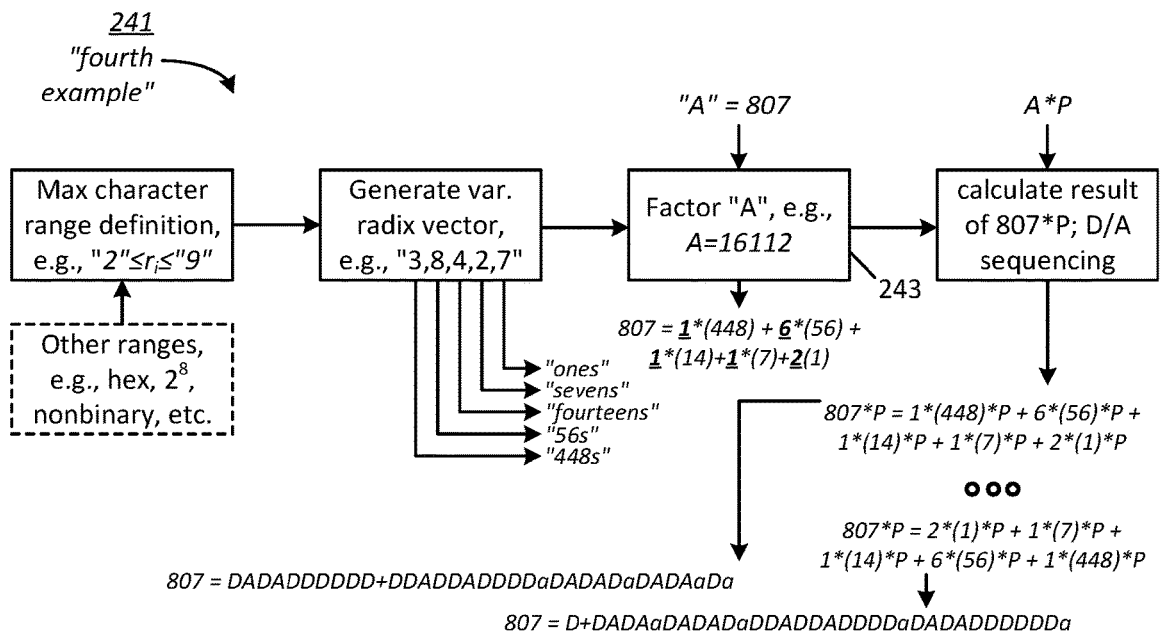
FIG. 2D is a block diagram showing one example of how techniques and structures described herein might be applied, e.g., in controlling a "double-and-add" execution unit or other dedicated math processing circuit.
Figure 2E:
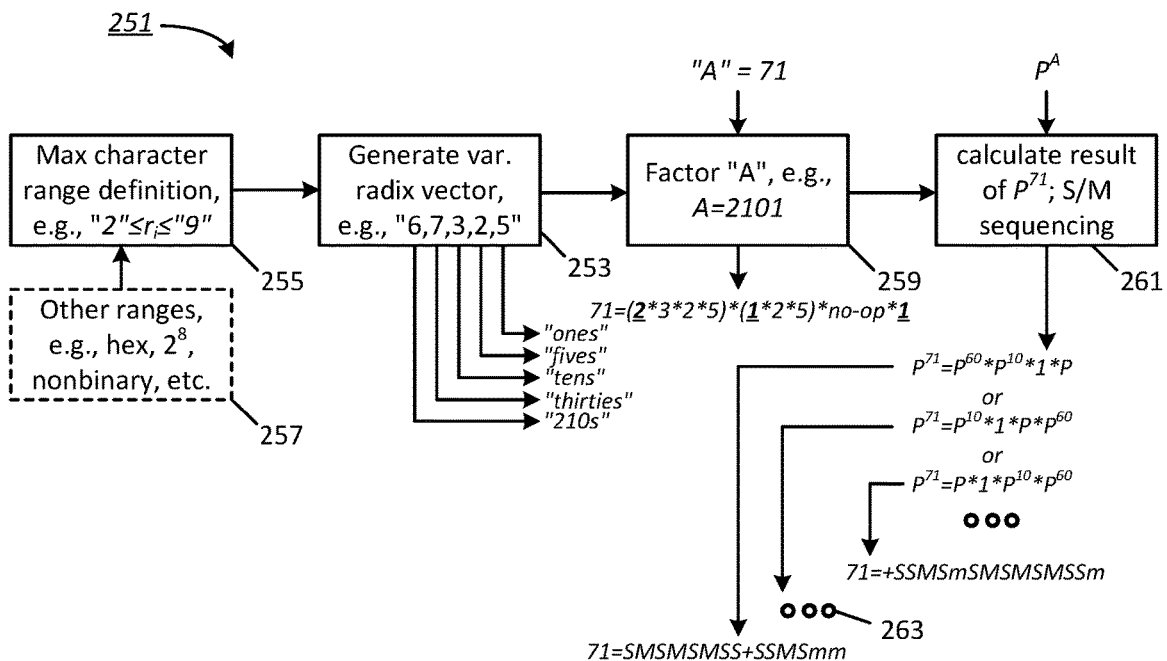
FIG. 2E is a block diagram showing one example of how techniques and structures described herein might be applied, e.g., in a "square-and-multiply" execution unit or other dedicated math circuit.

To underscore some examples as to how the variable radix methodology can be implemented, FIGS. 2A-2E will now be referred to, to provide some illustrative examples. As noted above, in a typical embodiment, the variable radix vector is changed with each new multiplication. However, this is not the case for FIGS. 2A-2D which illustrate two different vectors applied twice, for purposes of emphasizing some particulars of processing in the depicted embodiment. Specifically, it should be that one hypothetical radix vector "{6,7,3,2,5}" is used for discussing operations in FIGS. 2A-2B and another, alternative vector "{3,8,4,2,7}" is used for discussing operations in FIGS. 2C-2D; note again that, in practice, a variable radix vector will typically have many more than five digits (e.g., so as to span a large number space that might contain a multiplier, such as 0–($2^{256}$–1)). FIG. 2E will be used to provide an example rooted in application of the hypothetical radix vector {6,7,3,2,5} to the context of a "square-and-multiply" execution unit.

FIG. 2A shows a first example 201 of a multiplication process, namely, one that is called upon to compute the value 27*P using the hypothetical radix vector {6,7,3,2,5}. This vector will in some embodiments have been generated on-the-fly by dedicated hardware logic 203, for example, with a radix element range definition of 2-9, per numeral 205, and with potentially other numerical ranges being used and/or dynamically selected, per numeral 207. The input operator (e.g., multiplier, in this example), "27," is first factored according to the supplied variable radix vector, with the radix being varied as indicated by the individual elements of this vector. For example, the least significant character ("LSC") of the radix vector {6,7,3,2,5} represents a "ones" digit or character, and the second LSC represents a "fives" digit, or character, as discussed above. This radix vector can represent a range of 6×210 or 1260 possible values, corresponding to a decimal multiplier range of 0 through 1259. As indicated by FIG. 2A, the input operator "27" is factored (as indicated by function block 209) according to this radix representation, resulting in a value of "212,"

corresponding to two "tens," one "five" and two "ones." As indicated by numeral 211, these values (212) and the radix vector {6,7,3,2,5} are then applied to control sequencing of hardware circuitry to perform multiplication, i.e., to calculate 27*P. As noted earlier, the D/A execution unit can be sequenced to calculate each digit of the value "A" in radix numerical space (i.e., "212"), in a desired character order. For example, the bottom of FIG. 2A shows three different alternative ways to calculate 27*P, each alternative being according to the radix space expression of "A", i.e., 212.

In an uppermost alternative seen at the bottom right of the FIG. (i.e., the alternative labeled "27*P=2(2*5)*P+1(5)*P+2*P"), the value of 2*10*P is calculated first—this can correspond to the sequence of double-and-add control operations of DDADD*P; the result is stored in memory. Then, the value of 1(5)*P, or DDA*P is calculated, and added to memory, and finally the value 2*P or D*P is calculated and added to memory, yielding the aggregated value of 27*P. Note that the power signature of the D/A execution unit roughly corresponds to the sequence "DDADD+DDAaDa", where each "+" represents the equivalent of a load operation and the lower-case "a" denotes a power consumed by a second add operation which adds contents of an accumulator (first register) to a memory (second register). With an alternative character processing order represented in the middle, e.g., the alternative labeled "27*P=2*P+2(2*5)*P+1(5)*P," the power signature of the D/A execution unit generally corresponds to "D+DDADDaDDDa." The FIG. also shows a third example where yet another radix character sequence computes a "right-to-left order, i.e., the power signature of the D/A execution unit in this event generally corresponds to "D+DDAaDDADDa." Note that in each instance, the value of 27*P is calculated, but the calculation will exhibit a different power signature which varies dependent on execution order.

Turning to FIG. 2C, a third example 231 also uses this same multiplier "27" but this time shows use of a different variable radix vector, i.e., {3,8,4,2,7}. Here, the LSC is the "ones" term. the second LSC is the "sevens" term, and so forth, as illustrated in the FIG. This radix representation can express a decimal multiplier of 0-1343 (i.e., it can represent 1344 possible numeric values). As indicated in function block 263, the value "27" factored according to this radix vector, per numeral 233, is expressed as "116," i.e., corresponding to a first digit of "1" (i.e., one unit of 2×7), one unit of "seven" and a remainder of "6". Three exemplary different character processing orders are shown in this FIG. as well, i.e., a topmost alternative of "27*P=1(2*7)*P+1(7)*P+6*P" results in control over the D/A execution unit that generally exhibits a power signature of "DADAD+DADAa-DADa," and a second alternative (corresponding to "27*P=6*P+1(2*7)*P+1(7)*P" results a power signature of "DAD+DADADaDADAa;" finally, a "right to left" alternative labeled "27*P=6*P+1(7)*P+1(2*7)*P" results generally in a power signature of "DAD+DADAaDADADa." Each of these alternative processing sequences results in computation of exactly the same value (27*P), but with different power signature and/or timing or other externally-observable characterization. As should therefore be apparent, the variable radix vector usage results in varied mathematical sequencing, in a manner that inhibits/disrupts effectiveness of side channel attacks. This is to say, an attacker with or without pre-knowledge of the value "A" (e.g., something being encrypted or decrypted or being a private key) would be greatly inhibited in deriving or affirming the quantities "A" or "P" by monitoring the power signature or other statistical properties of the secure processor, because even if the static value A*P were repeatedly computed, variation in the mathematical operations attributable to the variable radix used for each new mathematical operation would result in a power signature which is potentially different each and every time. Similarly, the optional use of randomly varying the order of digital (i.e., character or term) computation can further obscure statistical correlation between power signature and repeated use of a secret value (e.g., a cryptographic value such as "A").

A different example 221 illustrated by FIG. 2B again shows use of the same original radix vector e.g., {6,7,3,2,6}, but this time, is exemplified where the input operator "A" is assumed to be the decimal value "807." Expressed according to the variable radix vector, the decimal value 807 is expressed as per function box 223 as "35212," i.e., denoting that there are 3 "210s" (7×3×2×5), 5 "30s" (3×2×5), 2 "10s" (2×5), 1 "5" and a remainder of "2." The right side of the FIG. shows two alternative orders in which the symbol-based values of 3*210*P, 5*30*P, 2*10*P, 5*P and 2*P can be separately calculated and summed, i.e., one that proceeds in symbol order from left-to-right, and one that conversely proceeds from right-to-left; of course, any symbol order, linear, random or otherwise, can also be used, depending on embodiment. As seen, a left-to-right order results in a power signature that generally tracks the sequence of "DDDADA-DADDADAD+DDDADDADADaDDADDaDDAaDa" (e.g., "630+150+20+5+2," parsed according to a divide-and-subtract sequence inversion process, as described above, implementing '3×7×3×2×5+5×3×2×5+2×2×5+5+2') while an alternative right-to-left order instead results in the sequence of "D+DDAaDDADDaDDDADDADADaDD-DADADADDADADa" (once again, implementing "2+5+20+150+630" as another term-varied addition order corresponding premised on a similar divide-and-subtract inversion process); each of these faithfully results in computation of 807*P, notwithstanding the variation in symbol processing order.

FIG. 2D represents another example 251 of calculation of this same value "807*P" but in accordance with the second of the two radix vectors described above, i.e., {3,8,4,2,7}; per function block 243, expression of "807" in the radix numerical space produces the value "16112," resulting in a double-and-add execution sequence having a rough power signature of "DADADDDDDD+DDADDADDDDaDADA-DaDADAaDa" for left-to-right character processing, and of "D+DADAaDADADaDDADDADDDDaDADA-DDDDDDa" for right-to-left character processing. Once again, it is seen that each of these faithfully produces the value of 807*P; each of these power signatures is also fundamentally different than the power signatures represented by the example of FIG. 1C, yet also produces calculation of the same value of 807*P.

FIG. 2E provides yet another example 251; unlike FIGS. 2A-2D, which illustrate examples where a double-and-add execution is used for math functions, FIG. 2E illustrates use of a "square-and-multiply" execution unit. Note that this type of unit is common in cryptographic processing where it is common to mathematically calculate values such as $P^A$, where P is a cryptographic key or encrypted operand having k bits, and where this digital value will be multiplied by itself "A" times (e.g., P*P*P . . . *P*P*P), and is then typically subjected to a modulo operation; the modulo operation itself is typically performed in a power-neutral manner for each operation, and hence, is typically is not of issue in terms of power-signature variability. As indicated in the FIG., for this example, the hypothetical radix vector {6,7,3,2,5} is once again used for purposes of discussion, although here "A" is illustrated as being equal to the base-10 number "71" (i.e., or "2101" in the format dictated by the hypothetical radix vector {6,7,3,2,5}).

As once again indicated at the left-hand side of the FIG., i.e., by reference numerals 253, 255, and 257, circuitry can be applied to identify a radix element maximum range, in base-10 format or otherwise, and to generate a variable radix vector that satisfies the identified range limitations. The input value 71 is then, once again, factored into the format of the identified radix vector ({6,7,3,2,5}), the results of which are then used to script squaring and multiplying functions of a hardware execution unit. For example, in the format of the variable radix expression {6,7,3,2,5}, $P^{71}$, as expressed by notation below function block 259, is "$(((P^2)^3)^2)^5 * [((P)^2)^5] * [\text{no-op}][P]$" (i.e., where each 'symbol' in the radix format represents a respective bracketed multiplicand). Per reference numeral 261, this identified sequence is used to control "square" and "multiply" operations that are analogous to the "double" and "add" operations described in examples above. For example, with "left-to-right" processing, on basis that is independent for each symbol, the square-and-multiply execution unit might be scripted to calculate $P^{71}=P^{60}*P^{10}*1*P$, corresponding to a sequence of "SMSMSMSS+SSMSmm" as seen at the bottom of the FIG. In this regard, an accumulator (first register) is initialized to P and a memory (second register) is initialized to "1," and individual multiply-and-square execution steps are then performed using these first and second registers; "S" indicates that accumulator (first register) contents are squared, "M" in this FIG. refers to multiplication and indicates that the accumulator (first register) contents are multiplied by P, "m" indicates that the memory (second register) is reset to existing memory (second register) contents multiplied by the content of the accumulator (first register), and also that the accumulator (first register) is then reset to P. and, finally, "+" once again represents a load register operation (e.g., to reset one of the registers to "P"). Thus, for example, the initial part (SMSMSMSS+) of this hypothetical sequence loads memory with $P^{60}$, the second part (SSMSm) of this hypothetical sequence further generates $P^{10}$ and multiplies existing memory by this value, and the final part of the sequence multiplies memory content by P. By contrast, if the square-and-multiply execution unit processes symbols of the (radix expressed) value in the reverse order i.e., "$[P][\text{no-op}]*[((P)^2)^5]*[(((P^2)^3)^2)^5]$," the processing sequence instead follows the order of "+SSMSmSMSMSMSSm." As implied by ellipses referenced by numeral 263, any symbol-processing order of the value "A" in the radix number space will yield the same result, and some embodiments therefore can optionally use an arbitrary (e.g., random) symbol processing order to further enhance entropy of power signature obfuscation. However, note that, as before, while random/arbitrary symbol processing order might be desired for some implementations, this order is not necessarily the most efficient or the fastest from a circuit design perspective; techniques discussed in FIGS. 3B and 6-8 below can therefore also optionally be applied, to provide a good mix of circuit design efficiency with scripted processing variation that provides for a high level of power signature obfuscation.

Figure 3B:
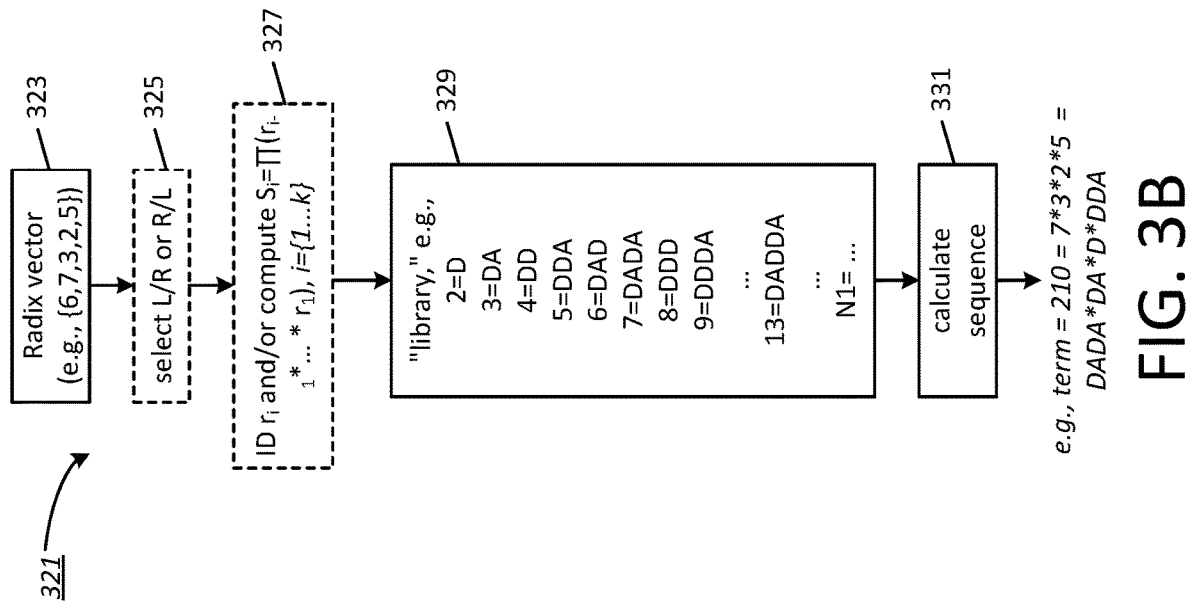
FIG. 3B is a block diagram showing another example of a technique for identifying a sequence of operations to be applied to control a hardware execution unit.
Figure 3A:
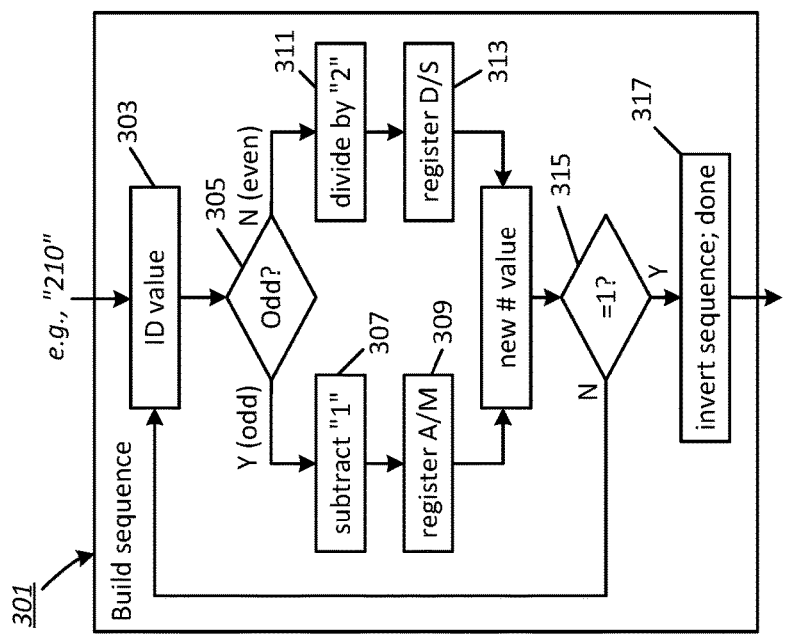
FIG. 3A is a block diagram showing one example of a technique for identifying a sequence of operations to be applied to control a hardware execution unit.

FIGS. 3A and 3B are used to illustrate some optional techniques for breaking down a basic mathematical process, such as addition, division, exponentiation, into a number of sequential steps, for example, in a manner that can be used to variably-identify scripted operations of a divide-and-add or square-and-multiply execution unit. The operations shown in these FIGS. are intended to be non-limiting and, indeed, many other processes for scripting execution flow will occur to those having ordinary skill in the art.

In one example, discussed above, a number can be processed by subtracting "1" from odd numbers and dividing even numbers by "2," and by inverting a resultant sequence. Such a process is illustrated by FIG. 3A and is used to build a sequence of execution steps, as generally designated by reference numeral 303. For example, FIG. 3A illustrates breakdown of a hypothetical input operator (and/or an individual "term" or symbol associated with an expression of that operator in the radix number space) into a sequence of steps, for example, "DADDADDDAD," such as is indicated at the bottom of the FIG. This process can be applied directly to any input multiplier (e.g., A=807), in some embodiments, while in other embodiments, such an input can be broken in a number of terms (e.g., 3*210+5*30+2*10+1*5+2=807) and applied to values corresponding to individual terms (e.g., 630, 320, 150, 20, etc.).

Per reference numeral 303, the process first identifies an input value (which in this case is initialized using a hypothetical value of "210"). As was exemplified earlier, this value is then subjected to a process where it is identified as odd or even (e.g., per decision block 305) and where, if the value is odd, "1" is subtracted from this value and a corresponding sequence step representing A (e.g., add or equivalently, M for multiply) is stored in a register, per numerals 307 and 309; alternatively, a value corresponding to D (e.g., double, or equivalently, S for square) is stored in a register, with the value being halved, as represented y numerals 311 and 313. A new numerical value obtained by this process is then compared to the value "1," and if this condition is not satisfied, this new value is then used in an ensuing iteration of the process as a new input value, as is indicated to be a consequence of decision block 315. For each new iteration, a new sequence step is identified for this process until the value that results is equal to "1," whereupon the sequence is inverted and the process terminates, per block 317. Thus, with "210" as the input value, in ensuing steps, this value is halved (to obtain "105") is decremented (to obtain "104"), is halved again (to obtain "52"), is halved again (to obtain "26"), is halved again (to obtain "13"), is decremented (to obtain "12"), is halved (to obtain "6"), is halved (to obtain "3"), is decremented and then halved again to obtain "1." The inverted sequence then becomes DADD-ADDDAD, as indicated at the bottom of the FIG., which can be used to script steps of an execution unit, as described herein. Note that, as with most every process described in this disclosure, these functions can be optionally implemented in software (e.g., firmware), in hardware (e.g., using logic gates and/or an FPGA), or can be instantiated as a combination of the two.

FIG. 3B illustrates an alternative method, in particular, one that is more suitable for an embodiment that processes input operands in left-to-right or right-to-left symbol order. In this method (represented by reference numeral 321), individual elements of a radix vector, for example, the hypothetical radix vector {6,7,3,2,5} can be combined or otherwise processed in a deterministic manner, to develop a term or symbol value, using a predefined library or index, represented by numeral 329. For example, such a process can begin with the radix vector just discussed, per numeral 323; optionally, the method can query whether a particular symbol order is to be used, for example, left-to-right or right-to-left symbol processing order, per numeral 325. For example, if it is assumed that processing is being performed in a right-to-left symbol order, and that consequently, one of the factored values of the input multiplicand "A" will be in units of "210" (i.e., 7*3*2*5), then a series of execution steps can be directly identified by using elements of the radix vector as an input and combining these values, as indicated by dashed-line block 327; in this case, each of these elements is converted to a predetermined sequence of steps, such as 7=DADA, 3=DA, 2=D and 5=DDA, as indicated by the FIG. These values can be combined by step 331 to yield an aggregate weight, for example, 210=DDA*DA*D*DADA, as indicated at the bottom of the FIG. These execution steps can then be used to control a sequence of steps involving multiple hardware registers; for example, if first and second registers are initially loaded with a base value "P," the expressed "D" and "A" operations respectively represent doubling contents of the first register and adding the content of the second register contents to the first register contents, and the multiplication symbol in this expression ("*") signifies that the second register contents should be loaded with the first register contents (to effect the new basis vector in both registers to get ready for the next double or add execution step), then this expression faithfully translates to scripted computation of the value 210*P. As indicated earlier, maximum radix element values other than "9" can be used and, in this event, the "library" 329 can be extended in range to provide scripted sequences for any other values with the maximum range r≤N1, e.g., if N1 were chosen to be "35," then a value could be stored in the library representing 35=DDDDADA. These and other variations of this implementation will occur to those of ordinary skill in the art and, as also indicated above, these techniques and variations can further be applied in a straightforward manner to square-and-multiply and other types of hardware-based execution units.

Figure 4:
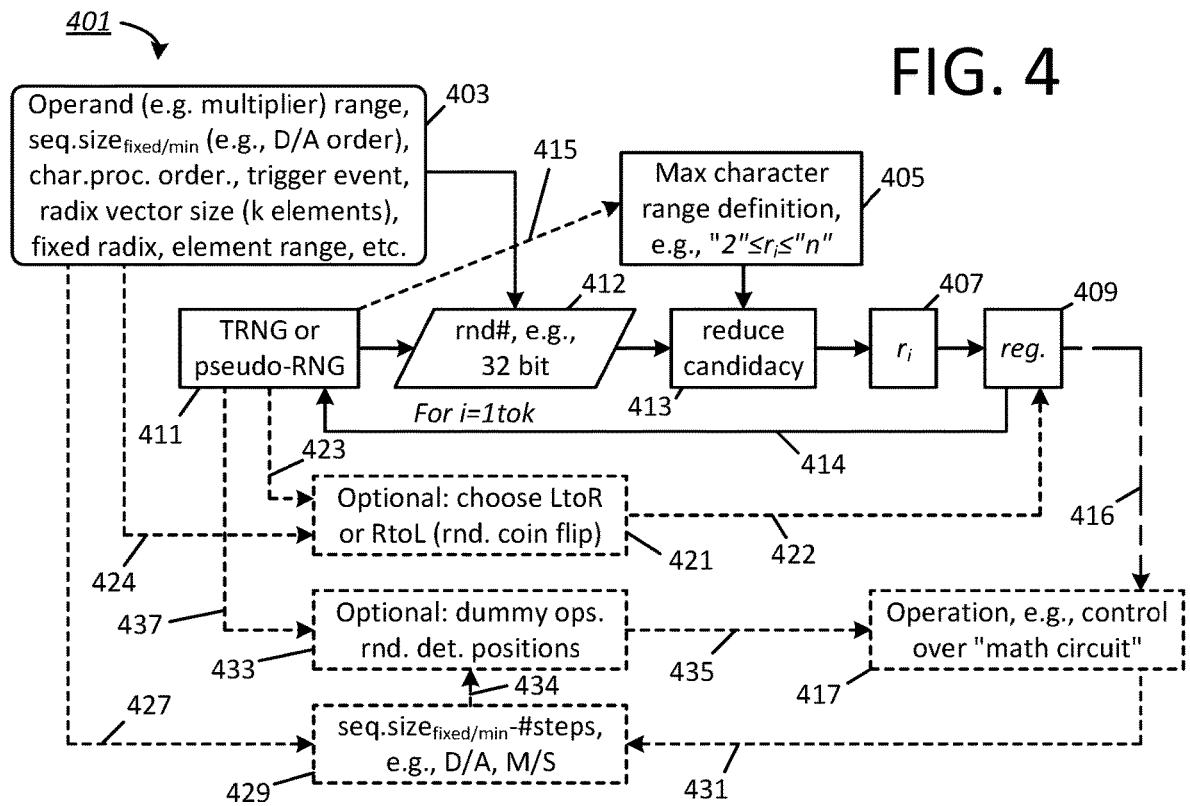
FIG. 4 is a block diagram showing set-up based on a variable radix vector and other optional values that can be applied, in one embodiment, to help obfuscate statistical patterns for a circuit/system.

As discussed earlier, a number of the specific embodiments discussed herein use variable radix processing to provide for a deterministic, variable, and automatic scripting of actions of a math processing circuit (e.g., in a processor). Two hypothetical but simple radix vectors of {3,8,4,2,7} and {6,3,7,2,5} were used in illustrative examples above; these vectors are simple because they each represent operand ranges of 0-1343 and 0-1259, respectively, whereas a typical processor implementation might operate on much, much larger numbers (e.g., having 256 bits, or larger); because the values of the individual elements of a variable radix vector determine the range of numbers the variable radix format can represent, in many embodiments, the variable radix vector, as it is generated, is deliberately over-provisioned in terms of number of elements, i.e., made larger than needed, so as to necessarily span the entire input operator's numeric range; some embodiments therefore take actions to identify a number of symbols in the variable radix number space that will be used to represent a given input operand, and to apply these in processing. FIG. 4 is used to discuss techniques used in some embodiments to perform these functions, in addition to some optional process variations; it is contemplated that any of the structures and/or techniques referenced by this FIG. can be used in combination and/or permutation with any of the other techniques or structures described in this disclosure.

More specifically, FIG. 4 shows an embodiment 401 that generates a variable radix vector for use by software and/or hardware. Several parameters are established as inputs to these functions, depending on embodiment; these parameters are collectively represented by reference numeral 403, and are seen to include (a) input number range (e.g., the maximum number that might be received as an input operator for multiplication, exponentiation, division, etc.); (b) a desired sequence size in number of steps ("seq·size$_{fixed/min}$"), e.g., representing a required or minimum number of execution steps (e.g., double-and-add, square-and-multiply, or similar); (c) a desired character/symbol processing order; (d) a radix vector size in terms of number of individual elements in each vector, e.g., 256 elements, and associated vector positions; (e) a fixed radix vector for the device or application (e.g., if the vector is not to be dynamically varied as the function of some other trigger); (f) identification of a trigger event basis, e.g., to automatically generate a new radix vector; (g) radix element range specification; and/or (h) other values. None of these values are required for any embodiment, and they may optionally be used in any combination or permutation. Furthermore, if any of these values are used, in various implementations, they may be established inferentially (e.g., based on application or context), by fuse or other hardwired configuration, by mode, or by other form of configuration (e.g., register configuration/programming).

For example, per reference numeral 405, a radix vector element desired range is established and used to bound generation of each individual element of the radix vector ($r_i$); each element of the radix vector is then individually generated, per reference numeral 407, with the full vector being stored in a hardware register 409. A true random number generator (TRNG) or pseudo random number generator 411 may optionally be used for each of these processes, i.e., to provide a 32-bit random number 412 that will be decimated to the desired range, for selective of individual elements of the radix vector, and/or to provide a 32-bit random number that will be decimated to establish maximum range of a radix vector element, i.e., to determine decimation applied by process 413 (that is, as indicated by numeral 405). Other options are also possible and will naturally occur to those having ordinary skill in the art. As to implementation of the TRNG or pseudo-RNG, as noted earlier, in one embodiment, the PUF structure described in co-owned U.S. patent Ser. No. 10/891,366 (which has been incorporated by reference) may be used to provide for random number generation, as described in that patent; other forms of random number generators are also well-known to integrated circuit designers and may be employed as desired. If, for example, a radix element range of 2-9 is to be used and a 32-bit random number is generated (412), the random number can be processed in a first modulo operation (e.g., using a large prime number such as "115249") and subjected to a second modulo operation (e.g., using the number eight), per numeral 413, to reduce candidacy and deterministically-select the individual radix element according to the remainder. If it is desirable to further reduce the probability distribution bias towards one of the eight candidates, the designated large prime number can be varied from time-to-time. Furthermore, if a zero-bias result is desired, the format-preserving tokenization structure described in co-owned U.S. patent Ser. No. 10/931,658 can be adopted and applied to this end. Again, there exist many contemplated variants of these processes (e.g., a common range can be used for all elements of a radix vector or any subset thereof, and/or can be specified/fixed by programming). As indicated by a processing loop flow path 414, the radix element definition process is repeated for each element of the radix vector ($r_i$), $1=1$ to k, until the entire radix vector is generated, with the entire vector then being stored in the hardware register 409 (e.g., shift-loaded into that register); the vector, once generated, is applied per control arrow 416, to provide scripted operational control over a dedicated math circuit 417.

As noted earlier, in some embodiments, instead of using a predefined character/symbol processing order for multiplicands (or other input operators) in the radix numerical space, a variable order can be used. FIG. 4 also illustrates an optional technique where a character processing order left-to-right or right-to-left processing order is determined by a random "coin flip" (e.g., random number output divided by two and harvesting the remainder, or decimated in some other manner, preferably in a manner that is "fair-coin," i.e., zero-bias in nature). These operations are reflected in FIG. 4 by a character order variation selection block 421, which optionally bases character order variation on a random number (i.e., provided as part of arrow flow 423), with a consequent character order format being programmed into register 409 together with the generated radix vector; this programming is indicated by flow arrow 422. This information is made available to the math processing circuit (e.g., with the generated radix vector), to configure hardware and dictate automatic scripting of the execution steps of the individual mathematical operation to be performed. Note that while FIG. 4 references a Boolean choice (left-to-right or right-to-left), this processing block is intended to also signify that in other embodiments any character processing order can be varied based on a random number. Alternatively, if the hardware supports different character processing orders, one of the input parameters (e.g., per numeral 403) can be used to predefine which processing order will be used, e.g., in a manner mandated for a particular application, or otherwise programmably-established, per numeral 424. For example, for some designs, each software application can program its own choice as to character processing order or specify random variation. As referenced above, some embodiments discussed below also advantageously use operational shortcuts in hardware, to avoid duplication of processing steps associated with each symbol of a value expressed in the radix format; to this effect, hardware in some embodiments is structured to support one of, or both of, left-to-right and right-to-left processing orders. In implementations that support both orders, hardware and/or firmware can be optionally configured to apply a randomly-selected one of these processing orders, again, dependent on the referenced "coin flip."

In yet another embodiment, a fixed or minimum sequence size can be specified for operational control of the math processing circuit, to further obfuscate the power signature and/or timing events associated with the processing being performed. For example, FIG. 2A discussed above suggests that processing steps associated with computing the value "27*P" might employ a double-and-add sequence of D+DDAaDDADDa (12 steps) for the radix vector of {6,7, 3,2,5}, while the example of FIG. 2C suggests that a sequence of DADAD+DADAaDADa (15 steps) might be used for a radix vector of {3,8,4,2,7}; in one embodiment, padding, in the form of dummy operations, can be used to provide for either a fixed aggregate number of steps or a minimum number of steps. In still other embodiments, some other form of padding can be used. As an example, if a minimum number of "13 steps" was specified, one embodiment might add a dummy operation "x" to the 12 step process only, optionally at a randomly selected position within the processing sequence, e.g., to obtain D+DDAaDD-ADDax; such a process further obfuscates correlation between operations performed and the circuit's power signature and/or associated timing. In the depicted implementation, the location insertion point of the dummy operation in the sequence can be based on a random number (e.g., per numeral 437), with a sort vector being generated as described by our other incorporated-by-reference patent, U.S. Pat. No. 9,635,011, and used to identify that insertion point. For example, thirteen random numbers can be generated, one being assigned to each of thirteen total steps of the execution sequence, including the dummy operation "x," with a prime number modulo process being applied and the numeric order of the thirteen remainders then being sorted and used to decide which one of thirteen operational slots will be assigned the dummy operation. In other implementations, the dummy operations can simply be prepended to or added to the end of the calculated processing sequence (e.g., as leading or trailing padding), or inserted in some other manner. To cite a second example, in one embodiment, a fixed number of processing steps is specified, e.g., 18 as an example; in this second example, the first (12-step) processing sequence referenced above might be padded with 6 dummy operations, inserted at random points, e.g., D+DyxDAzaDxyDzADDax, where x, y and z are each different dummy operations randomly selected, with different associated power characteristics, and the second (15-step) processing sequence might be padded with three steps in the same manner to be something like DADxyzADaDA-DAaDADa, i.e., such that the same number of total operational sequence steps (e.g., 18) are employed, irrespective of selected radix. Clearly, these examples are nonlimiting, and many variations of these techniques will occur to those having ordinary skill in the art. To perform padding of the type indicated, any pertinent start value (e.g., seq·size$_{fixed/min}$) which establishes operational parameters is retrieved, per reference numeral 427 and, as indicated by processing block 429, is compared with information 431 representing the calculated operational sequence, to identify the number of dummy steps that are to be generated and inserted. This information is then provided to processing block 433, via flow arrow 434, which identifies the specific dummy operations and sequence insertion points; per arrow 435, control logic then injects these dummy operations into the calculated operational sequence.

Figure 5:
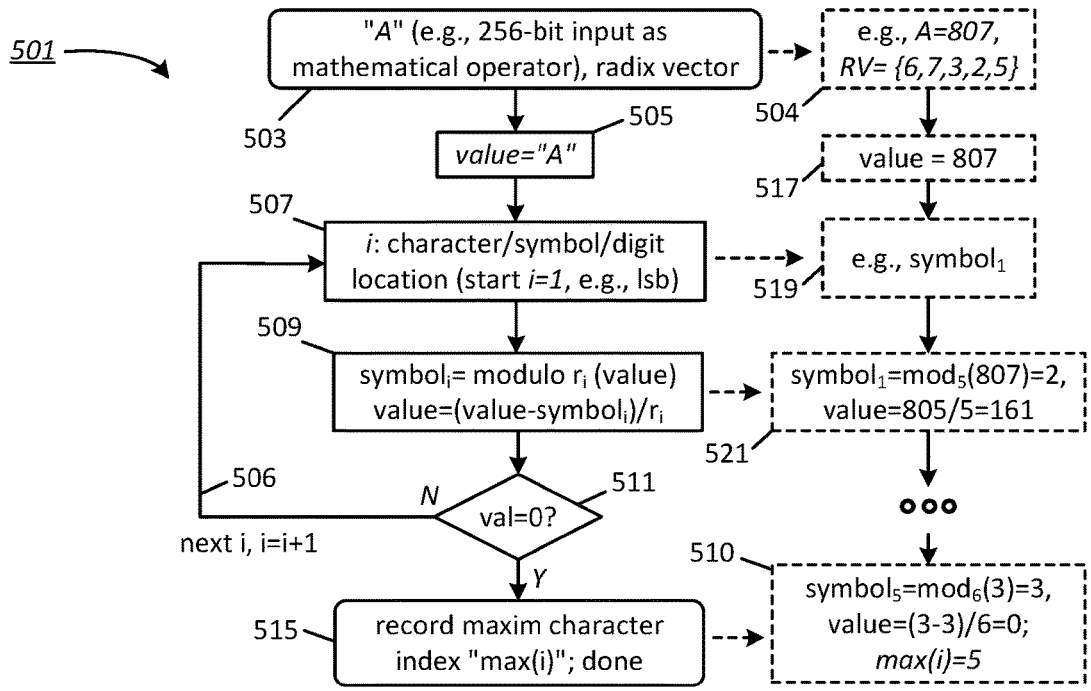
FIG. 5 is a block diagram showing techniques that can be used to identify a number of characters/symbols of an input value (e.g., the value "A") as expressed in a variable radix format.

FIG. 5 is a flow chart that describes how the number of characters of an operand "A" is identified in the number space described by the generated variable radix vector; steps associated with this process are generally referenced in the FIG. by reference numeral 501. As noted earlier, vector size can be deliberately over-provisioned, because random radix selection for each element of the radix vector implies a variable vector length depending on the numeric value of each element of the radix vector; for example, if one assumes a hypothetical radix maximum range of 2-16 (i.e. offering fifteen choices), but a randomly generated radix were to be "{2,2,2,2}," then all four of these elements would be required to express an exemplary "A" value of 15 (i.e., the value of "15" decimal is "1,1,1,1" in binary). By contrast, if the radix for the least significant element of the radix vector were 16, then, the entire exemplary "A" numeric range of 0-15 could be expressed using a single character (e.g., "F" in hex for the maximum "A" value 15). Accordingly, in the depicted embodiment, as part of the factoring process, software and/or hardware processes the input operand (e.g., "A") to find out the position of its most-significant character in the radix numerical space.

The left-side of FIG. 5 shows steps associated with this (hardware or software) flow, while the right-side, featuring a set of dashed-line boxes, is used to illustrate examples of data produced in the various steps. First, as indicated by reference numeral 503, the input operator "A" is received (seen in this example to be a 256-bit number), together with a supplied variable radix vector. As indicated by numeral

504, "A" is once again taken for purposes of discussion as the number 807, while this example once again uses "{6,7,3,2,5}" as one possible, simple radix vector. Per numeral 505, the system proceeds to initialize a register (i.e., representing the variable "value") to be equal to "A," and it commences a loop 506, according to which it evaluates each symbol in turn until it identifies the highest order character that will represent "A." Per numeral 509; the system calculates symbol, as the remainder of the modulo $r_i$ of the current value, and it also resets this value to be equal to the quantity (value−symbol$_i$)/$r_i$.

Per numerals 517, 519 and 521, as seen at the right-hand side of the FIG., and using "A"=807 and the radix vector RV={6,7,3,2,5}, the system might calculate the least significant character symbols (i.e., i=1) of A in the radix number space as symbol$_1$=modulo$_s$ (807), which is the number 2. Per the indicated formula, this embodiment would then reset the value to be (807−2)/5, i.e., to the number 161. In the next iteration of the loop, i is incremented, such that it is now "2," and the computations of function block 509 then produce symbol$_2$=modulo$_2$(161), which is the number "1," and it then resets the value to be (161−1)/2, i.e., to the number 80. Similarly, a third iteration yields symbol$_3$=modulo$_3$(80), which is the number "2," and it then resets the value to be (80−2)/3, i.e., to the number 26. A fourth iteration yields symbol$_4$=modulo$_7$(26), which is the number "5," and it then resets the value to be (26−5)/7, i.e., to the number "3." The final iteration yields symbol$_s$=modulo$_6$(3), which is the number "3," and it then resets the value to be (3−3)/6, i.e., to the number "0;" this process is represented by block 510. As this value is now zero, per decision block 511, the system determines that no further loop iteration is necessary, and a process 515 records the maximum symbol of "A" as expressed in radix numeral space {6,7,3,2,5} as the value five, i.e., max(i)=5, and it also derives the expression of A in this space as 35212, i.e., the remainder from each of the loop iterations referenced above. These two values, i.e., maximum character order and the value of A as expressed in the variable radix space, are then applied to further processing (discussed below).

Figure 6:
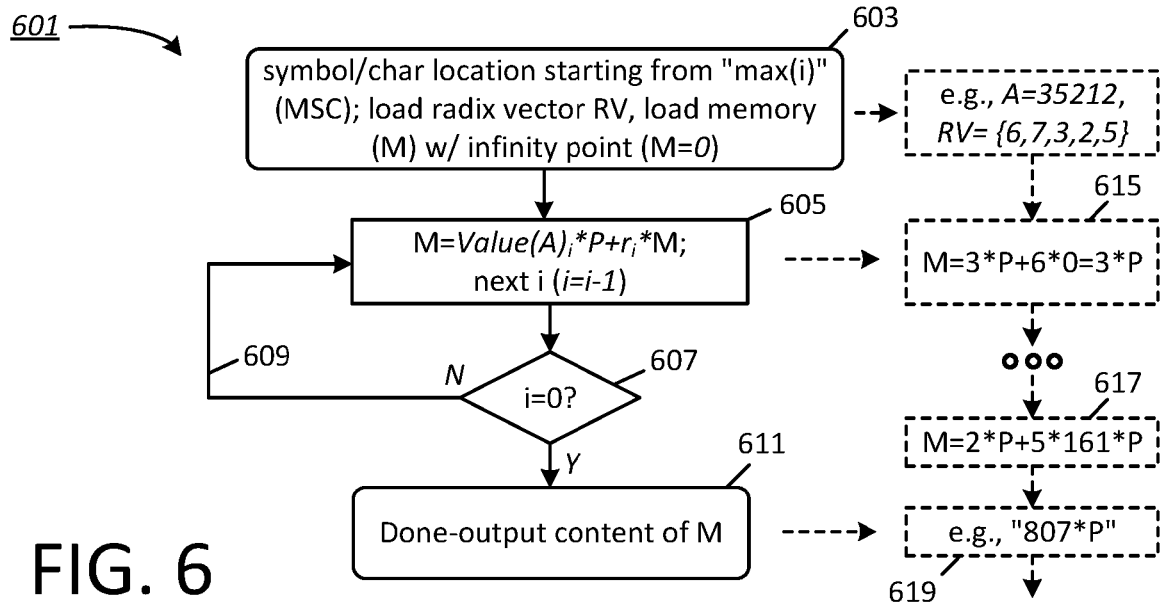
FIG. 6 is a block diagram showing circuit control techniques that can optionally be applied to help minimize/reduce the number of mathematical steps needed to compute a mathematical result.

FIG. 6 is used to describe use of a left-to-right symbol processing order and reduction of processing duplication in some of the described embodiments. As alluded to elsewhere herein, a radix vector RV has a number of elements $\{r_{k-1}, \ldots, r_2, r_1\}$ and the value A expressed in this number space is "A=$a_k s_k + a_{k-1} s_{k-1} \ldots + a_1 s_1$," where:

$s_k = \Pi(r_{k-1} \ldots r_1)$, where $k \geq 1$ and where $s_1 = 1$.

Consequently, A is given generally by A= $a_k(r_{k-1}^* \ldots *r_2*r_1) + a_{k-1}(r_{k-2}^* \ldots *r_2*r_1) \ldots + a_1*1$. As can be seen from this expression, if the individual factors of A are independently calculated, then the multiplication of many of the values (e.g., $r_3*r_2*r_1$) might have to be performed multiple times, resulting in processing inefficiency. To avoid this inefficiency, the embodiment of FIG. 6 applies a processing algorithm which is generally designated by reference numeral 601, where values are calculated on an incremental basis. More particularly, as indicated by reference numeral 603, circuitry/software starts with the maximum character, identified in the FIG. as the variable "max (i)," and it loads this value, the radix vector (e.g., RV={6,7,3,2,5}) and the value=A=35212, and it also initializes its memory "M" (i.e., used relative to this FIG. to refer to content of the second register) with the infinity point, i.e., the "zero" vector.

To calculate the value 807*P, the system begins a looped process, starting with the functions of block 605. The most significant character of the value, i.e., value$_i$, where i=5, is multiplied by the value P, with the result being added to $r_i$*M; the system then resets the memory contents to this value for the next iteration of the loop. For example, as indicated once again at the right of the FIG., in box 615, the most significant character (MSC) of the value, value$_s$, is equal to "3," $r_s$ (the MSC of the radix vector) is equal to 6, and M=0. As a consequence, following this first iteration, the memory M will hold M=3*P+6*0=3P. The symbol value i is then decremented, i.e., moving from left (MSC) to right (LSC) symbol position, such that i is then equal to 4. Because i is not yet equal to zero, per decision block 607 and loop 609, the system then proceeds to the next iteration and calculates value$_i$*P+$r_i$*M, for i=4; since the memory (M) content from the last iteration was 3*P, this calculation produces value$_4$*P+$r_4$*3*P=5*P+7*3*P=26*P, which is then used to replace the content of the memory (M). Ensuing iterations, in similar fashion, respectively calculate value$_3$*P+$r_3$*26*P=2*P+3*26P=80*P, value$_2$*P+$r_2$*80*P=1*P+2*80*P=161*P, and value$_1$*P+$r_1$*161*P=2*P+5*161*P=807*P. This last step is indicated by function block 617, seen at the right side of the FIG., after which the process terminates, per numeral 611. The value 807*P is then output, as indicated by box 619. As should be apparent based on a comparison with embodiments that perform symbol processing in arbitrary order, the process depicted in FIG. 6 helps avoids duplication, e.g., the quantity "161," as an example, is calculated only once.

This type of computational savings, in some of the described embodiments, can also be obtained by processing in the reverse order, that is, on a right-to-left symbol basis (i.e., starting with the LSC and proceeding to the MSC). An embodiment that performs this type of processing is generally indicated by numeral 701 in FIG. 7.

More specifically, as indicated by reference numeral 703, in this embodiment, the system starts with the right-most symbol of the expression of "A" in the radix number space, i.e., with i=1.; the system also loads the memory (register) with the infinity point (i.e., M=zero) and an accumulator (another register) with P (i.e., Acc=P). Using the same examples as previously, the system also loads into registers the generated radix vector of RV={6,7,3,2,5} and the value of A as expressed in the pertinent radix numerical format, as indicated by dashed-line box 713. The system then once again proceeds in a loop flow 709, each iteration increasing i by one and testing for whether i exceeds max(i) (which it will be recalled was calculated to be "5," i.e., pursuant to the process of FIG. 5); a decision process 707 is thus, in this example, used to detect when i=6, and to consequently terminate loop flow, per block 711 when max(i) is exceeded. With each loop iteration, the system performs the function depicted in processing box 705, namely, it calculates the values:

$M = \text{Value}(A)_i * \text{Acc} + M$; and $\text{Acc} = \text{Acc} * r_i$.

As indicated by dashed-line block 715, seen at the right of the FIG., in the first iteration (where i=1), the system calculates Value(A)$_i$*Acc+M=Value(A)$_i$*P+0=2*P+0=2*P, and it consequently sets M to 2*P for the next loop iteration; it also sets the accumulator Acc=Acc*$r_i$=P*$r_1$=5*P and increments i for the next loop iteration. In sequence, using these formulas, the system then proceeds to perform the following sequential calculations:

set $M=\text{Value}(A)_2*\text{Acc}+M=1*5*P+2*P=7*P$; set
    $\text{Acc}=\text{Acc}*r_2=5*P*2=10*P$;    Step 2— set $M=\text{Value}(A)_3*\text{Acc}+M=2*10*P+7*P=27*P$; set
    $\text{Acc}=\text{Acc}*r_3=10*P*3=30*P$;    Step 3— set $M=\text{Value}(A)_4*\text{Acc}+M=5*30*P+27*P=177*P$; set
    $\text{Acc}=\text{Acc}*r_4=30*P*7=210*P$;    Step 4— set $M=\text{Value}(A)_5*\text{Acc}+M=3*210*P+177*P=807*P$.    Step 5—

Figure 7:
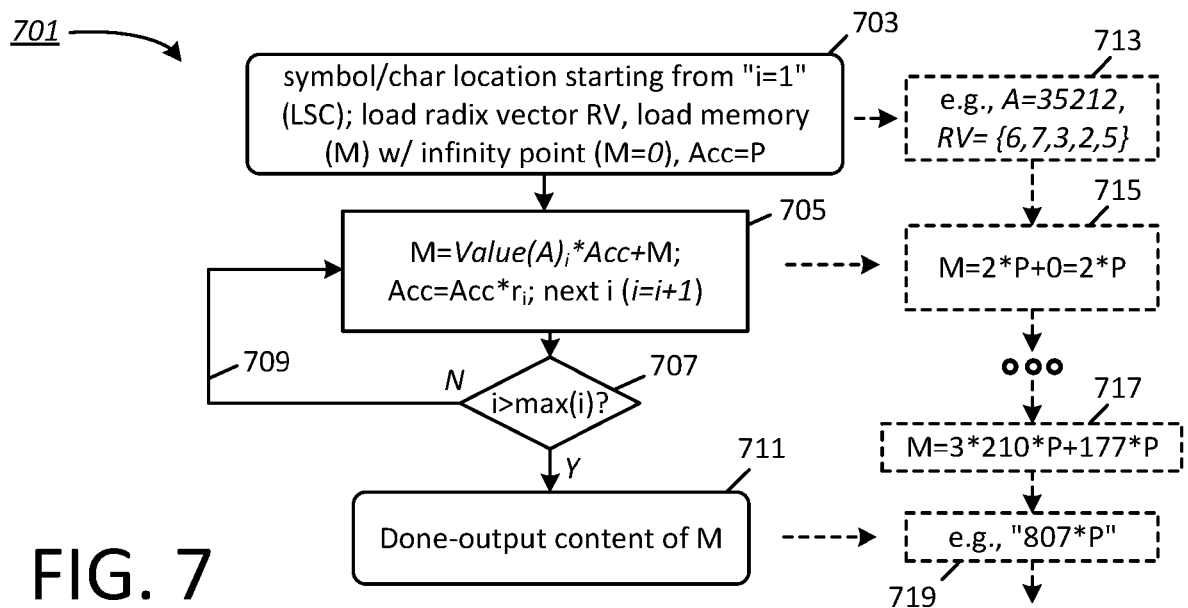
FIG. 7 is a block diagram showing circuit control techniques that can optionally be applied to help minimize/reduce the number of mathematical steps needed to compute a mathematical result.

The last step of this calculation is represented in dashed-line box 717, and as indicated by dashed-line box 719, the system once again outputs from the memory (register) M the calculated value of 807*P. As was the case with the example presented by FIG. 6, this processing methodology calculates operators on a rolling basis and avoids duplication of effort for successive symbols of the value A in the radix number space; for example, the value 30*P is calculated only once, in the third step identified above, and need not be recalculated for other symbols of A. As was the case for the example provided by FIG. 6, the example provided by FIG. 7 provides for a substantial degree of processing efficiency relative to a fully arbitrary symbol processing order, and/or relative to a system that performs multiplication for each factored component of A on an independent basis. However, as indicated above, a random symbol processing order does provide for greater entropy in masking the power signature and/or timing signature associated with the mathematical operation being performed and associated operands, and may be preferred for some embodiments.

Figure 8:
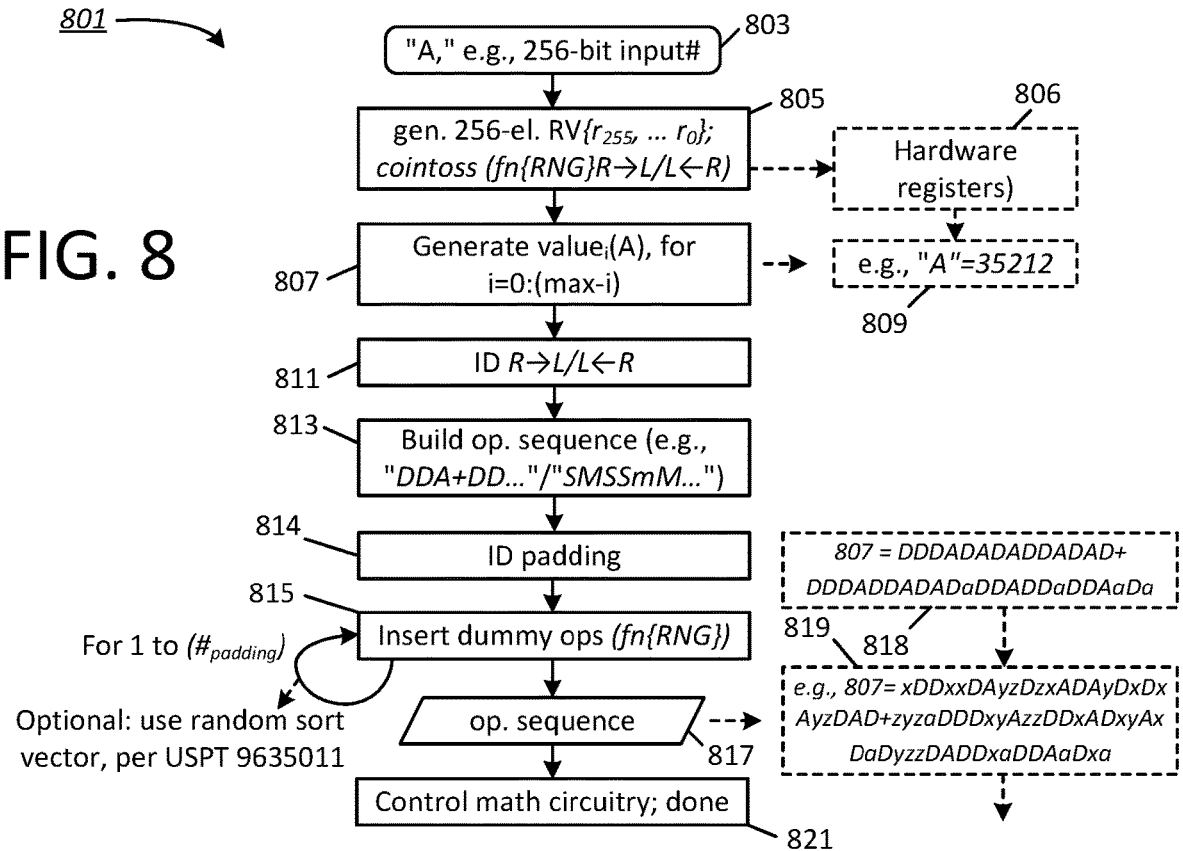
FIG. 8 is a block diagram showing functions associated with an embodiment that inserts "dummy operations," e.g., to further obfuscate a power signature and other statistical characteristics associated with scripted operations of a math processing circuit.

FIG. 8 is used to present an embodiment 801 that combines features of variation in symbol processing order, but that leverages the processing efficiencies provided by the algorithms used by the embodiments of FIGS. 6-7. This is to say, circuitry again uses two registers M and Acc, as per the example presented by FIG. 7, but further permits variation in terms of whether left-to-right or right-to-left processing order is performed, with hardware being configured dependent on whichever processing direction (i.e., left or right) is specified.

More particularly, the input operator "A" is once again any desired number, e.g., a 256-bit input number, per reference numeral 803. The system in this example generates a 256-position radix vector RV, and it performs a "coin toss" to determine whether left-to-right or right-to-left processing will be performed, per numeral 805. The "coin toss" is implemented in this embodiment as a random process, in which 32-bit random number is selected and is then processed to select this direction, e.g., by taking the least significant character of this number (or, conversely, the most significant character of this number); other processes that more fully leverage the entropy encompassed in the whole 32-bits (e.g., harvesting the decision from the parity of the whole 32-bits, whereby a parity-1 dictates left-to-right and a parity-0 dictates the right-to-left order) can instead be used; again, many, many variations to these processes can be implemented at the discretion of a designer to implement a "coin toss" or its equivalent. Note that a coin toss is not required for all implementations, e.g., it is also possible for software (e.g., an application) to select the processing direction, or for direction to be decided upon in some other manner, for example, by programming into the depicted hardware registers 806, or as part of a mode of operation. The system then generates the value of A as expressed in the radix numerical space, e.g., using one of the methodologies previously described, per numeral 807. As seen in example box 809, the value "A=35212" is once again exemplified. As indicated by function blocks 811 and 813, the system then proceeds to retrieve the identified symbol-processing order direction and it builds an operational sequence that will be used to script operation of the math processing circuitry, e.g., as has previously been described. For example, for double-and-add execution circuitry, the system might build up a sequence of operations such as "DDA+DD . . . " and, for a square-and-multiple execution circuitry, the system might build up a sequence of operations such as "SMSSmM . . . ," each as indicated in the FIG. As noted previously, double-and-add and multiply-and-square execution circuitry are not the only types of math processing circuits that can be controlled using the techniques described herein, and it is well within the skill of a logic designer to implement varied operational control sequences for other types of math processing circuits, using processes and techniques as exemplified above. Whichever expression format is used, the operational control sequence will ultimately be used to script the order of processing steps of the math processing circuitry, as denoted by reference numeral 821.

Some designers, as noted earlier, might desire to insert some amount of padding into the execution sequence, to further obfuscate power signature or timing signature of processing circuits. This is not required for all embodiments. For those designers that do choose to implement such a structure, several different types of padding (i.e., dummy operations) are possible. In some embodiments, dummy operational circuitry is provided that is not used for a calculation in progress; for example, it is possible to design math circuitry to include a register or other logic circuit that simply consumes power upon application of an activation signal, or that otherwise generates noise that will obfuscate external monitoring. In some embodiments, multiple, alternative such circuits can be provided, e.g., with different power, noise and/or timing effects, to vary the way in which dummy operations are manifested. Alternatively, dummy operations can be performed which use the same circuitry as is used for calculations, but which are performed in a manner to not affect a calculation; for example, a number can be added to a register and then subtracted, or a set of shift operations can be invoked which do not change a value that is being processed. Many examples will occur to a skilled designer, each of which is contemplated for use in combination with the various features described herein as an example of the use of dummy operations.

For the particular embodiment of FIG. 8, a quantity of padding that is to be inserted is first identified, per function block 814. For example, this can be based on a comparison between a calculated execution sequence and a predetermined minimum number of sequence steps or required number of steps, e.g., see block 403 in FIG. 4, and its associated description above. As indicated by reference numeral 815, a loop process is then performed using a random number (e.g., 32-bit, fn{RNG}) to generate a sort vector, in which every sequenced step (e.g., D/A/a or S/M/m) is represented by an element of the vector, and in which each padding step has an element and an associated position; use of a sort vector is described by our second incorporated-by-reference patent, U.S. Pat. No. 9,635,011. The sort vector is generated in association with a modulo operation and a subsequent sort operation; the vector element corresponding to padding, and its end position in the sorted vector, is used to specify a random insertion point for the particular dummy operation, that is, in between execution steps of the unmodified execution sequence that has already been calculated, or as leading or trailing operations. Once the dummy operations are inserted into the sequence, this produces a modified aggregate operational sequence, per numeral 817. For example, example block 818 shows the previously used sequence example to calculate 807*P, that is, using the hypothetical operating sequence of 807*P=(P) DDDADADADDADAD+DDDADDADADaDDADD-aDDAaDa; if it is desired to insert 26 dummy operations at random positions, the result might be (P)xDDxx-DAyzDzxADAyDxDxAyzDAD+zyz-aDDDxyAzzDDxADxyAxDaDyzzDADDxaDDAaDxa, where x, y and z are each different alternative dummy operations, per numeral 819. Note that the relative order of the "true" executional steps (e.g., D/A/a) has not changed relative to the original calculated sequence expressed at block 818, but that the power signature and/or timing signature will be substantially different than as represented by block 818.

Once again, there are many ways of inserting dummy operations or further entropy into the variable processes described herein which will occur to those having ordinary skill in the art; each of these variations is contemplated by this disclosure, even if not expressly discussed in detail herein.

Figure 9:
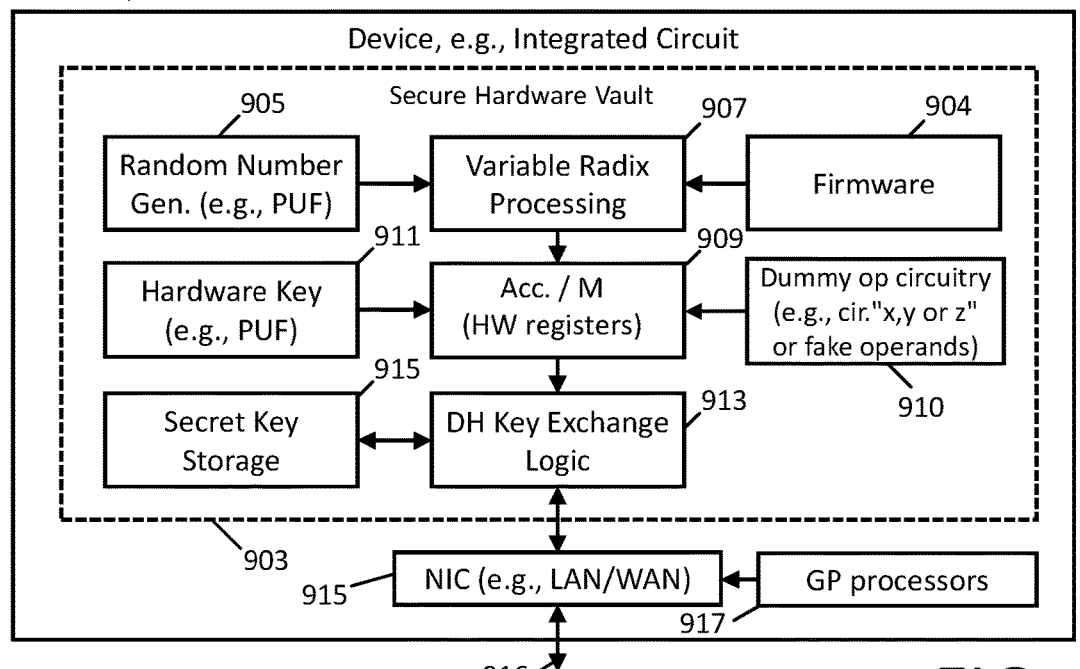
FIG. 9 shows a block diagram of one embodiment of an integrated circuit.

FIG. 9 illustrates another embodiment 901, this time depicting a block diagram of one possible implementation of a device, e.g., an integrated circuit, or "IC." In this embodiment, a secure hardware vault 903 is seen to have circuitry that performs functions of a random number generator 905 (e.g., optionally based on a PUF, as discussed earlier), a variable radix processor 907 (which generates and applies radix vectors to control sequenced operations, as discussed elsewhere herein), an accumulator Acc, memory "M" and/or other hardware registers 909, and a source 911 of a cryptographic key, e.g., optionally a hardware key provided from use of a PUF as described in the incorporated-by-reference documents. As discussed earlier, in some embodiments, the techniques discussed herein are optionally implemented to perform key-based operations such as Diffie-Hellman (DH) key exchange, and to this effect, can use a root key that is provided by hardware on a secure basis, and that fingerprints the individual digital device (i.e., integrated circuit 901). The techniques described herein are not so-limited, however. As indicated by function block 910, the depicted integrated circuit can also include dummy operational circuitry, e.g., to further obfuscate power/timing/noise analysis of the integrated circuit 901, as has been described elsewhere herein. The integrated circuit also includes DH key exchange logic 913, which advantageously, is designed to support multiple cryptographic processes such as DSA (Digital Signature Algorithm), AES (Advanced Encryption Standard symmetrical key encryption/decryption), SHA (Secure Hash Algorithm), PQC (Post Quantum Cryptography) and/or other now-standard, later-standardized and/or or non-standard cryptographic functions. Any keys and/or operands used for these operations can be stored in secret key storage 915, as depicted in the FIG. In this regard, as is known, with Diffie-Hellman key exchange, a cryptographic key (such as hardware key 911) is used to encrypt secrets exchanged between two parties, which are then used to establish a symmetric, secret key known only to the two parties involved in the exchange. The symmetric, secret key can then be stored in the secret key storage 915 (e.g., RAM, nonvolatile memory, or other storage), and is then used for secure communication and/or storage, for example, via a network interface card (NIC) 915, e.g., via a local- or wide-area network (LAN or WAN), as indicated by numeral 916. Non-volatile private-key/public-key pairs, ephemeral-and-volatile private-key/public-key pairs and other operands can also be stored in the secret key storage 915. The depicted IC can also include one or more general purpose processors for various purposes, which, as indicated by the FIG., do not necessarily have to be within the secure vault 903. Finally, as represented by reference numeral 919, none, some, or all of the various circuits described can be controlled in whole or in part by firmware, which for example, configures hardware circuitry to perform the operations associated with various ones of the embodiments. This is to say, in some embodiments, the techniques referenced above are implemented entirely in hardware logic, while in others firmware or other instructional logic can be used to dictate the operation of circuitry so as to perform functions described herein. The firmware or other instructional logic can reside in (e.g., be provided in or downloaded to) physical storage media on the IC.

It should be apparent, based on the discussion above, that the techniques provided by this disclosure render hardware circuits, especially processors and secure circuits which are relied upon to produce math operations, more robust to side channel attacks. Not all features described above are required for every embodiment.

Still other embodiments will be immediately apparent based on a review of this disclosure, including without limitation embodiments which do not dynamically vary an applied radix, and/or use other means to permute performance of associative mathematical functions, and/or which do not rely on the use of a PUF or RNG, and/or which vary the sequencing of circuits other than D/A or S/M execution units. These embodiments, as with those described elsewhere herein, may be optionally mixed and matched with any of the structures and techniques described herein, and none of them are to be deemed "essential" for any implementation or embodiment. Some embodiments described above have referenced operands of various sizes, e.g., such as 32-bit random numbers, 256-bit numerical inputs and the like; it is expressly contemplated that various embodiments can use any size numbers as inputs or operands, including without limitation, any conventional numerical range (e.g., 16-bit, 32-bit, 64-bit, 128-bit, 256-bit, and other sizes as well). In some cases, an input value (for example, A, B, P, etc.) has a predetermined size such as one of these conventional sizes (e.g., 32-bit number) and the output of a math processing circuit (e.g., a multiplication circuit) provides a result having this same format in terms of size, e.g., a 32-bit output. Without limitation, some input and/or output values could be 2-dimensional or higher-dimensional vectors, e.g., with data sizes increased proportionally relative to the dimension.

The circuits and techniques described above may be further constructed using automated systems that fabricate integrated circuits, and may be described as instructions on non-transitory media that are adapted to control the fabrication of such integrated circuits. For example, the components and systems described may be designed as one or more integrated circuits, or a portion(s) of an integrated circuit, based on design control instructions for doing so with circuit-forming apparatus that controls the fabrication of the blocks of the integrated circuits. The instructions may be in the form of data stored in, for example, a computer-readable medium such as a magnetic tape or an optical or magnetic disk or other non-transitory media as described earlier. Such design control instructions typically encode data structures or other information or methods describing the circuitry that can be physically created as the blocks of the integrated circuits. Although any appropriate format may be used for such encoding, such data structures are commonly written in Caltech Intermediate Format (CIF), Calma GDS II Stream Format (GDSII), or Electronic Design Interchange Format (EDIF), as well as high level description languages such as VHDL or Verilog, or another form of register transfer language ("RTL") description. Those of skill in the art of integrated circuit design can develop such data structures from schematic diagrams of the type detailed above and the corresponding descriptions and encode the data structures on computer readable medium. Those of skill in the art of integrated circuit fabrication can then use such encoded data to fabricate integrated circuits comprising one or more of the circuits described herein.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order but merely to assist in explaining elements of the technology. In some instances, the terminology and symbols may imply specific details that are not required to practice those embodiments. The terms "exemplary" and "embodiment" are used to express an example, not a preference or requirement. Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology.

As noted earlier, various documents have been incorporated into this disclosure by reference. The definitions provided by this reference are to control (i.e., predominate over any definitions in the incorporated by reference documents) in the event of any inconsistency or conflict, implicit or otherwise, with the meaning of terms as used in this document.

Various modifications and changes may be made to the embodiments presented herein without departing from the broader spirit and scope of the disclosure. Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

We claim:

1. An integrated circuit, comprising a secure processor, the secure processor having:
    at least one register to store a digital value which is dependent on a cryptographic key;
    circuitry, including at least one random number generator, to dynamically generate a variable radix vector, the variable radix vector including a first radix and a second radix, each of the first radix and the second radix being dependent on an output of the at least one random number generator, each of the first radix and the second radix being independent of each other and being free to be numerically different from one another;
    circuitry to convert an input operand of a mathematical calculation to a numeric expression having digits, the numeric expression defined dependent on elements of the variable radix vector, including by factoring the input operand using the first radix and a result of the factoring using the second radix, wherein the input operand is a first one of an input value or the digital value;
    circuitry to perform the mathematical calculation using the numeric expression and a second one of the input value or the digital value, to obtain a result of the mathematical calculation, in a manner such that mathematical calculation comprises a sequence of steps; and
    circuitry to dynamically select one of a first processing order or a second processing order for the steps in the sequence of steps, dependent on an output of the at least one random number generator, wherein the sequence of steps in each processing order is different from each other and is dependent on each of the first radix, the second radix and the result of the factoring;
    wherein the result of the mathematical calculation does not vary for different values of the dynamically generated variable radix vector, including for different values of the first radix and including for different values of the second radix, and does not vary dependent on whether the first processing order or the second processing order is selected; and
    wherein:
        the circuitry to convert the input operand is operable to:
            divide the input operand using the first radix, to produce a first quotient and a first remainder;
            divide the first remainder by the second radix, to obtain a second remainder;
        the first quotient and the second quotient are respective ones of the digits; and
        the first one comprises a left-to-right processing order of the digits, and wherein the second one comprises a right-to-left symbol processing order of the digits.

2. The integrated circuit of claim 1 wherein the circuitry to perform the mathematical calculation comprises a double-and-add execution unit, and wherein the circuitry to perform the mathematical calculation is to variably sequence an order of doubling steps and adding steps to be performed by the double-and-add execution unit, in a manner dependent on the numeric expression, to produce the result of the mathematical calculation.

3. The integrated circuit of claim 1 wherein the circuitry to perform the mathematical calculation comprises a square-and-multiply execution unit, and wherein the circuitry to perform the mathematical calculation is to variably sequence an order of squaring steps and multiplying steps to be performed by the square-and-multiply execution unit, in a manner dependent on the numeric expression, to produce the result of the mathematical calculation.

4. The integrated circuit of claim 1 wherein the secure processor comprises general purpose circuitry and instructions stored on at least one physical storage medium that, when executed, are to configure said general purpose circuitry to operate as special purpose circuitry.

5. The integrated circuit of claim 1 wherein the cryptographic key comprises at least 128 bits and wherein the first one and the second one each also comprise at least 128 bits.

6. The integrated circuit of claim 1 wherein the circuitry to dynamically select is to select between multiple processing orders, including the first processing order and the second processing order, and the circuitry to dynamically select is to switch between randomly-selected ones of the multiple processing orders.

7. The integrated circuit of claim 1 wherein the circuitry to dynamically switch is to do so dependent on an output of the at least one random number generator.

8. The integrated circuit of claim 7 wherein each random number generator of the at least one random number generator is dependent on a respective hardware-implemented physically unclonable function (PUF).

9. The integrated circuit of claim 1 wherein the circuitry to dynamically generate the variable radix vector is to independently generate the first radix and the second radix dependent on respective random numbers provided by the at least one random number generator.

10. The integrated circuit of claim 1 wherein each of the first radix and the second radix is to have a range of between two and N, where N is at least sixteen.

11. The integrated circuit of claim 1 wherein:
the circuitry to perform the mathematical calculation is to perform respective instances of the mathematical calculation, each using a respective value of the digital input; and
the circuitry to dynamically generate the variable radix vector is to dynamically generate a respective variable radix vector for each of the respective instances of the mathematical calculation, wherein the first radix and the second radix of each respective variable radix vector are free to respectively differ in value from a corresponding first radix and a corresponding second radix of each other respective variable radix vector.

12. The integrated circuit of claim 1 wherein the circuitry to perform the mathematical calculation comprises circuitry to cause performance of one or more dummy operations in between the steps of the series.

13. The integrated circuit of claim 1 wherein:
the variable radix vector further comprises a third radix, the third radix being dependent on an output of the random number generator, the third radix being independent of the first radix and the second radix, and free to be numerically different than each the first radix and the second radix;
the result of the factoring is a first result;
the circuitry to convert the input operand to the numeric expression is operable to factor the input operand using the first radix to obtain the first result, to factor the first result using the second radix to obtain a second result, and to factor the second result using the third radix to obtain a third result; and
the sequence of steps is further dependent on each of the third radix and the third result, and the result of the mathematical processing does not vary for different values of the variable radix vector, including for different values of the first radix, different values of the second radix or different values of the third radix.

14. The integrated circuit of claim 1 wherein:
the circuitry to perform the mathematical calculation comprises circuitry to cause performance of dummy operations; and
the dummy operations comprise one or more first steps of injecting a value and one or more second steps of neutralizing the injection of the value.

15. An integrated circuit, comprising a secure processor, the secure processor having:
at least one register to store a digital value which is dependent on a cryptographic key;
circuitry, including at least one random number generator, to dynamically generate a variable radix vector, the variable radix vector including a first radix and a second radix, each of the first radix and the second radix being dependent on an output of the at least one random number generator, each of the first radix and the second radix being independent of each other and being free to be numerically different from one another;
circuitry to convert an input operand of a mathematical calculation to a numeric expression having digits, the numeric expression defined dependent on elements of the variable radix vector, including by factoring the input operand using the first radix and a result of the factoring using the second radix, wherein the input operand is a first one of an input value or the digital value;
circuitry to perform the mathematical calculation using the numeric expression and a second one of the input value or the digital value, to obtain a result of the mathematical calculation, in a manner such that mathematical calculation comprises a sequence of steps; and
circuitry to dynamically select one of a first processing order or a second processing order for the steps in the sequence of steps, dependent on an output of the at least one random number generator, wherein the sequence of steps in each processing order is different from each other and is dependent on each of the first radix, the second radix and the result of the factoring;
wherein:
the result of the mathematical calculation does not vary for different values of the dynamically generated variable radix vector, including for different values of the first radix and including for different values of the second radix, and does not vary dependent on whether the first processing order or the second processing order is selected;
the sequence of steps comprises a first subsequence and a second subsequence, the first subsequence and the second subsequence being non-overlapping;
the secure hardware processor further comprises circuitry to generate a look-up table that indexes each respective possible value of each of the digits to a series of steps; and
the first subsequence is selected dependent on the series of steps indexed to a first one of the digits and the second subsequence is selected dependent on the series of steps indexed to a second one of the digits.

16. The integrated circuit of claim 15 wherein:
the circuitry to convert the input operand is operable to:
divide the input operand using the first radix, to produce a first quotient and a first remainder;
divide the first remainder by the second radix, to obtain a second remainder;
the first quotient and the second quotient are respective ones of the digits; and
the first one comprises a left-to-right processing order of the digits, and wherein the second one comprises a right-to-left symbol processing order of the digits.

17. The integrated circuit of claim 15 wherein:
the circuitry to perform the mathematical calculation comprises circuitry to cause performance of a number of dummy operations in between the steps of the series; and
the number of the dummy operations is selected, dependent on a number of the steps in the sequence, such that at least one of a number of processing steps in the mathematical calculation or a number of the digits matches a predetermined number.

18. The integrated circuit of claim 17 wherein the circuitry to cause performance is operable to insert respective ones of the dummy operations at randomly-selected locations between the steps in the sequence, dependent on an output of the at least one random number generator.

19. The integrated circuit of claim 18 wherein the dummy operations comprise one or more first steps of injecting a value and one or more second steps of neutralizing the injection of the value.

20. An integrated circuit, comprising a secure processor, the secure processor having:
   at least one register to store a digital value which is dependent on a cryptographic key;
   circuitry, including at least one random number generator, to dynamically generate a variable radix vector, the variable radix vector including a first radix and a second radix, each of the first radix and the second radix being dependent on an output of the at least one random number generator, each of the first radix and the second radix being independent of each other and being free to be numerically different from one another;
   circuitry to convert an input operand of a mathematical calculation to a numeric expression having digits, the numeric expression defined dependent on elements of the variable radix vector, including by factoring the input operand using the first radix and a result of the factoring using the second radix, wherein the input operand is a first one of an input value or the digital value;
   circuitry to perform the mathematical calculation using the numeric expression and a second one of the input value or the digital value, to obtain a result of the mathematical calculation, in a manner such that mathematical calculation comprises a sequence of steps; and
   circuitry to dynamically select one of a left-to-right processing order or a right-to-left processing order for first and second subsets of the steps in the sequence of steps, dependent on an output of the at least one random number generator, wherein each subset comprises at least one of the steps in the sequence and wherein the sequence of steps in each processing order is different from each other and is dependent on a respective one of the digits;
wherein the result of the mathematical calculation does not vary for different values of the dynamically generated variable radix vector, including for different values of the first radix or different values of the second radix, and does not vary dependent on whether the first processing order or the second processing order is selected;
wherein the circuitry to perform the mathematical calculation comprises circuitry to cause performance of a number of dummy operations in between the steps of the series; and
wherein the number of the dummy operations is selected, dependent on a number of the steps in the sequence, such that at least one of a number of processing steps in the mathematical calculation or a number of the digits matches a predetermined number; and
wherein:
   the circuitry to convert the input operand is operable to:
      divide the input operand using the first radix, to produce a first quotient and a first remainder;
      divide the first remainder by the second radix, to obtain a second remainder;
   the first quotient and the second quotient are respective ones of the digits; and
   the first one comprises a left-to-right processing order of the digits, and wherein the second one comprises a right-to-left symbol processing order of the digits.

* * * * *